US009934433B2

(12) United States Patent
Thompson et al.

(10) Patent No.: US 9,934,433 B2
(45) Date of Patent: *Apr. 3, 2018

(54) GLOBAL GEOGRAPHIC INFORMATION RETRIEVAL, VALIDATION, AND NORMALIZATION

(71) Applicant: Kofax, Inc., Irvine, CA (US)

(72) Inventors: Stephen Michael Thompson, Oceanside, CA (US); Jan W. Amtrup, Silver Spring, MD (US); Anthony Macciola, Irvine, CA (US)

(73) Assignee: KOFAX, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/686,017

(22) Filed: Aug. 24, 2017

(65) Prior Publication Data
US 2017/0351915 A1 Dec. 7, 2017

Related U.S. Application Data

(63) Continuation of application No. 15/146,848, filed on May 4, 2016, now Pat. No. 9,767,354, which is a (Continued)

(51) Int. Cl.
G06K 9/00 (2006.01)
G06F 17/30 (2006.01)
(Continued)

(52) U.S. Cl.
CPC ..... G06K 9/00469 (2013.01); G06F 17/3028 (2013.01); G06F 17/30256 (2013.01);
(Continued)

(58) Field of Classification Search
CPC ........... G06K 9/00442; G06K 9/00456; G06K 9/00469; G06K 9/03; G06F 17/20;
(Continued)

(56) References Cited

U.S. PATENT DOCUMENTS 6,052,124 A 4/2000 Stein et al.
6,094,198 A 7/2000 Shashua
(Continued)

FOREIGN PATENT DOCUMENTS

CN 101339566 A 1/2009
CN 101673402 A 3/2010
(Continued)

OTHER PUBLICATIONS

Corrected Notice of Allowance from U.S. Appl. No. 14/927,359, dated Aug. 2, 2017.
(Continued)

Primary Examiner — Daniel Mariam
(74) Attorney, Agent, or Firm — Zilka-Kotab, P.C.

(57) ABSTRACT

A computer program product includes program instructions configured to cause a processor, to: perform optical character recognition (OCR) on an image of a document; extract an identifier of the document from the image based at least in part on the OCR; compare at least portions of the identifier with content from one or more reference data sources; and determine whether the identifier is valid based at least in part on the comparison. The content comprises global address information; while the content from the reference is derived from geographic information. Deriving the content from the geographic information includes: obtaining the geographic information; and parsing the geographic information according to a set of predefined heuristic rules, where the heuristic rules are configured to normalize the global address information obtained from the one or more sources according to a single convention for representing address information.

20 Claims, 6 Drawing Sheets

Related U.S. Application Data continuation-in-part of application No. 14/588,147, filed on Dec. 31, 2014, now Pat. No. 9,342,741, which is a continuation of application No. 14/176,006, filed on Feb. 7, 2014, now Pat. No. 8,958,605, which is a continuation-in-part of application No. 13/948,046, filed on Jul. 22, 2013, now Pat. No. 8,855,425, which is a continuation of application No. 13/691,610, filed on Nov. 30, 2012, now Pat. No. 8,526,739, which is a continuation of application No. 12/368,685, filed on Feb. 10, 2009, now Pat. No. 8,345,981.

(51) Int. Cl.
| | | |
|---|---|---|
| G06K 9/48 | (2006.01) | |
| G06K 9/03 | (2006.01) | |
| G06Q 10/10 | (2012.01) | |
| G06K 9/18 | (2006.01) | |
| H04N 1/40 | (2006.01) | |

(52) U.S. Cl.
CPC .. *G06F 17/30371* (2013.01); *G06F 17/30542* (2013.01); *G06K 9/00442* (2013.01); *G06K 9/00456* (2013.01); *G06K 9/03* (2013.01); *G06K 9/18* (2013.01); *G06K 9/481* (2013.01); *G06Q 10/10* (2013.01); *H04N 1/40* (2013.01); *H04N 1/40062* (2013.01)

(58) Field of Classification Search
CPC .......... G06F 17/30256; G06F 17/3028; G06F 17/30371; G06F 17/30542
USPC ......................................... 382/112, 218, 313
See application file for complete search history.

(56) References Cited

U.S. PATENT DOCUMENTS

| | | | |
|---|---|---|---|
| 6,571,008 B1 | 5/2003 | Bandyopadhyay et al. | |
| 7,542,931 B2* | 6/2009 | Black | G06Q 20/02 238/57 |
| 8,059,888 B2 | 11/2011 | Chen et al. | |
| 8,126,924 B1 | 2/2012 | Herin | |
| 8,553,984 B2 | 10/2013 | Slotine et al. | |
| 8,620,078 B1 | 12/2013 | Chapleau et al. | |
| 8,681,150 B2 | 3/2014 | Kim et al. | |
| 8,811,751 B1 | 8/2014 | Ma et al. | |
| 9,239,713 B1 | 1/2016 | Lakshman et al. | |
| 9,251,614 B1 | 2/2016 | Tian | |
| 9,367,899 B1 | 6/2016 | Fang | |
| 9,386,235 B2 | 7/2016 | Ma et al. | |
| 9,483,794 B2 | 11/2016 | Amtrup et al. | |
| 9,648,297 B1 | 5/2017 | Ettinger et al. | |
| 9,747,504 B2 | 8/2017 | Ma et al. | |
| 9,754,164 B2 | 9/2017 | Macciola et al. | |
| 9,760,788 B2 | 9/2017 | Shustorovich et al. | |
| 9,767,379 B2 | 9/2017 | Macciola et al. | |
| 9,769,354 B2 | 9/2017 | Thrasher et al. | |
| 9,779,296 B1 | 10/2017 | Ma et al. | |
| 9,819,825 B2 | 11/2017 | Amtrup et al. | |
| 2004/0022439 A1 | 2/2004 | Beardsley | |
| 2004/0252190 A1 | 12/2004 | Antonis | |
| 2005/0226505 A1 | 10/2005 | Wilson | |
| 2006/0082595 A1 | 4/2006 | Liu et al. | |
| 2006/0095830 A1 | 5/2006 | Krishna et al. | |
| 2006/0239539 A1 | 10/2006 | Kochi et al. | |
| 2007/0011334 A1 | 1/2007 | Higgins et al. | |
| 2007/0031028 A1 | 2/2007 | Vetter et al. | |
| 2007/0204162 A1* | 8/2007 | Rodriguez | H04K 1/00 713/176 |
| 2007/0255653 A1 | 11/2007 | Tumminaro et al. | |
| 2008/0211809 A1 | 9/2008 | Kim et al. | |
| 2009/0110267 A1 | 4/2009 | Zakhor et al. | |
| 2009/0254487 A1 | 10/2009 | Dhar et al. | |
| 2010/0049035 A1 | 2/2010 | Hu et al. | |
| 2010/0142820 A1 | 6/2010 | Malik et al. | |
| 2010/0174974 A1 | 7/2010 | Brisebois et al. | |
| 2010/0214291 A1 | 8/2010 | Muller et al. | |
| 2011/0004547 A1 | 1/2011 | Giordano et al. | |
| 2011/0025825 A1 | 2/2011 | McNamer et al. | |
| 2011/0181589 A1 | 7/2011 | Quan et al. | |
| 2011/0313966 A1 | 12/2011 | Schmidt et al. | |
| 2012/0195466 A1 | 8/2012 | Teng et al. | |
| 2012/0269398 A1 | 10/2012 | Fan et al. | |
| 2012/0284185 A1 | 11/2012 | Mettler et al. | |
| 2012/0301024 A1 | 11/2012 | Yuan et al. | |
| 2013/0066798 A1 | 3/2013 | Morin et al. | |
| 2013/0078983 A1 | 3/2013 | Doshi et al. | |
| 2014/0032406 A1 | 1/2014 | Roach et al. | |
| 2014/0055812 A1 | 2/2014 | DeRoller | |
| 2014/0149308 A1 | 5/2014 | Ming | |
| 2014/0211991 A1 | 7/2014 | Stoppa et al. | |
| 2015/0093033 A1 | 4/2015 | Kwon et al. | |
| 2015/0248391 A1 | 9/2015 | Watanabe | |
| 2017/0103281 A1 | 4/2017 | Amtrup et al. | |
| 2017/0104885 A1 | 4/2017 | Amtrup et al. | |
| 2017/0109576 A1 | 4/2017 | Shustorovich et al. | |
| 2017/0109588 A1 | 4/2017 | Ma et al. | |
| 2017/0109606 A1 | 4/2017 | Macciola et al. | |
| 2017/0109610 A1 | 4/2017 | Macciola et al. | |
| 2017/0109818 A1 | 4/2017 | Amtrup et al. | |
| 2017/0109819 A1 | 4/2017 | Amtrup et al. | |
| 2017/0109830 A1 | 4/2017 | Macciola et al. | |
| 2017/0111532 A1 | 4/2017 | Amtrup et al. | |
| 2017/0147572 A1 | 5/2017 | Kilby et al. | |
| 2017/0286764 A1 | 10/2017 | Ma et al. | |
| 2017/0357869 A1 | 12/2017 | Shustorovich et al. | |

FOREIGN PATENT DOCUMENTS

| | | |
|---|---|---|
| CN | 101894262 A | 11/2010 |
| EP | 1229485 A2 | 8/2002 |
| JP | 2002109242 A | 4/2002 |
| JP | 2004363786 A | 12/2004 |
| JP | 2005071262 A | 3/2005 |
| JP | 2005208861 A | 8/2005 |
| JP | 2006126941 A | 5/2006 |
| JP | 2010062722 A | 3/2010 |
| JP | 2012008791 A | 1/2012 |
| JP | 2012058904 A | 3/2012 |
| JP | 2012217159 A | 11/2012 |
| WO | 2013059599 A1 | 4/2013 |

OTHER PUBLICATIONS

Corrected Notice of Allowance from U.S. Appl. No. 14/927,359, dated Aug. 9, 2017.
Corrected Notice of Allowance from U.S. Appl. No. 15/191,442, dated Aug. 2, 2017.
Notice of Allowance from U.S. Appl. No. 15/389,342, dated Aug. 14, 2017.
Notice of Grounds of Rejection from Japanese Application No. 2015-229466, dated Jul. 18, 2017, with English Translation.
Non-Final Office Action from U.S. Appl. No. 14/829,474, dated Aug. 17, 2017.
Office Action from Japanese Patent Application No. 2016-512078, dated Aug. 8, 2017.
Corrected Notice of Allowance from U.S. Appl. No. 15/389,342, dated Aug. 30, 2017.
Non-Final Office Action from U.S. Appl. No. 15/214,351, dated Sep. 5, 2017.
Shustorovich et al., U.S. Appl. No. 15/672,200, filed Aug. 8, 2017.
Notice of Allowance from U.S. Appl. No. 15/390,321, dated Oct. 4, 2017.
Final Office Action from U.S. Appl. No. 14/932,902, dated Oct. 20, 2017.
Corrected Notice of Allowance from U.S. Appl. No. 15/390,321, dated Oct. 20, 2017.

(56) References Cited

OTHER PUBLICATIONS

Supplementary European Search Report from European Application No. 15764687.8, dated Oct. 17, 2017.
Examination Report from European Application No. 14775259.6, dated Oct. 25, 2017.
Office Action from Chinese Patent Application No. 201480014229.9, dated Oct. 10, 2017.
Examination Report from European Application No. 13738301.4, dated Oct. 26, 2017.
Non-Final Office Action from U.S. Appl. No. 15/234,993, dated Dec. 14, 2017.
Final Office Action from U.S. Appl. No. 15/424,756, dated Dec. 22, 2017.
Non-Final Office Action from U.S. Appl. No. 15/157,325, dated Jan. 8, 2018.
Advisory Action from U.S. Appl. No. 14/932,902, dated Jan. 23, 2018.
Non-Final Office Action from U.S. Appl. No. 15/390,321, dated Jan. 23, 2018.
Non-Final Office Action from U.S. Appl. No. 14/829,474, dated Jan. 25, 2018.
Kofax Inc, "Module 2—Kofax Capture Overview," Jun. 2011, pp. 1-22.
Kofax Inc., "Kofax Capture 10.0 Developer's Guide," Aug. 1, 2011, 138 pages.
Final Office Action from U.S. Appl. No. 15/214,351, dated Jan. 25, 2018.

\* cited by examiner

US 9,934,433 B2

GLOBAL GEOGRAPHIC INFORMATION RETRIEVAL, VALIDATION, AND NORMALIZATION

PRIORITY CLAIM

This application is a continuation of U.S. patent application Ser. No. 15/146,848, filed May 4, 2016, which is a continuation-in-part of U.S. patent application Ser. No. 14/588,147, filed Dec. 31, 2014, which is a continuation of U.S. patent application Ser. No. 14/176,006, filed Feb. 7, 2014, which is a continuation-in-part of U.S. patent application Ser. No. 13/948,046, filed Jul. 22, 2013, which is a continuation of U.S. patent application Ser. No. 13/691,610, filed Nov. 30, 2012, which is a continuation of U.S. patent application Ser. No. 12/368,685, filed Feb. 10, 2009. Priority is claimed to each of the foregoing applications, the contents of which are herein incorporated by reference.

FIELD OF THE INVENTION

The present invention relates to document analysis systems, methods, and computer program products, and more particularly, this invention relates to systems, methods, and computer program products for retrieving, determining validity of, and/or normalizing geographic information such as addresses and coordinates in unique formats used in various localities around the globe.

BACKGROUND OF THE INVENTION

In the present day, business transactions are recorded as an exchange of information between two or more parties. The information is generated by the sender and can come to the receiver via a variety of means, e.g. via a paper document, an electronic document, an image taken using a mobile device, etc. Within a business transaction it is implicitly assumed that both parties have some information about the document content and the type of transaction.

Many times, the receiving party has to validate the content of the received document by comparing the document's content with its view of the transaction. This, for example, can be achieved by a human reading the document and comparing the document content to corresponding content already in the recipient's possession. However, the layout and the forms of documents differ vastly between senders and are loosely structured, making the automatic extraction and recognition of the relevant information very challenging and inaccurate. Moreover, such manual review is both time consuming and expensive.

In addition, when the information relevant to the transaction includes geographic information such as part or all of an address, validating the received information is particularly challenging due to the lack of readily accessible and authoritative reference information against which to compare the received geographic information. For instance, while geographic information may be obtained via subscribing to a particular service, such as services relying on United States Postal Service address data, these services are expensive, and limited in scope to a particular locality. Accordingly, the available data often include only a limited portion of international addresses. Compiling a global source of data based on these proprietary services would be prohibitively expensive.

Moreover, since addresses in various international localities often follow different conventions in terms of the formatting and content of the geographic information associated with a particular location or individual, it is extremely challenging to obtain a suitable source of reference geographic information for purposes of validating extracted geographic information, e.g. address data, across various international locations and standards. This challenge is independent of any economic considerations associated with using proprietary versus public data sources, and represents a significant challenge to validating, retrieving, and normalizing geographic information representative of locations all around the globe.

Therefore, there is a current need for an improved method of automatic business transaction document validation, and particularly for validation and normalization of address information according to various international standards.

SUMMARY

In accordance with one embodiment, a computer program product includes a non-transitory computer readable storage medium having stored/encoded thereon computer readable program instructions configured to cause a processor, upon execution thereof, to: perform optical character recognition (OCR) on an image of a document; extract an identifier of the document from the image based at least in part on the OCR; compare at least portions of the identifier with content from one or more reference data sources; and determine whether the identifier is valid based at least in part on the comparison. The content from the one or more reference data sources comprises global address information; while the content from the one or more reference data sources is derived from geographic information organized in one or more of a proprietary address database and an open source address database. Deriving the content from the geographic information includes: obtaining the geographic information from one or more of the proprietary address database and an open source address database; and parsing the geographic information according to a set of predefined heuristic rules, wherein the set of predefined heuristic rules are configured to normalize the global address information obtained from the one or more sources according to a single convention for representing address information.

According to another embodiment, a computer program product includes a non-transitory computer readable storage medium having stored/encoded thereon computer readable program instructions configured to cause a processor, upon execution thereof, to: capture an image using a camera of a mobile device; classify the image as an image of a document, wherein the classifying comprises: generating a first feature vector representative of the document, based on analyzing the image; and comparing the first feature vector to a plurality of reference feature matrices; perform optical character recognition (OCR) on the image of the document; extract an identifier of the document from the image based at least in part on the OCR; compare the identifier with content from one or more reference data sources; determine whether the identifier is valid based at least in part on the comparison; and, in response to determining the identifier is valid: associating the image of the document with metadata descriptive of one or more of the document and information relating to the document; and storing the image of the document and the associated metadata to a memory of the mobile device. The content from the one or more reference data sources comprises global address information; while the content from the one or more reference data sources is derived from geographic information organized in one or more of a proprietary address database and an open source address database. Deriving the content from the geographic information includes: obtaining the geographic information from one or more of the proprietary address database and an open source address database; and parsing the geographic information according to a set of predefined heuristic rules, wherein the set of predefined heuristic rules are configured to normalize the global address information obtained from the one or more sources according to a single convention for representing address information.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
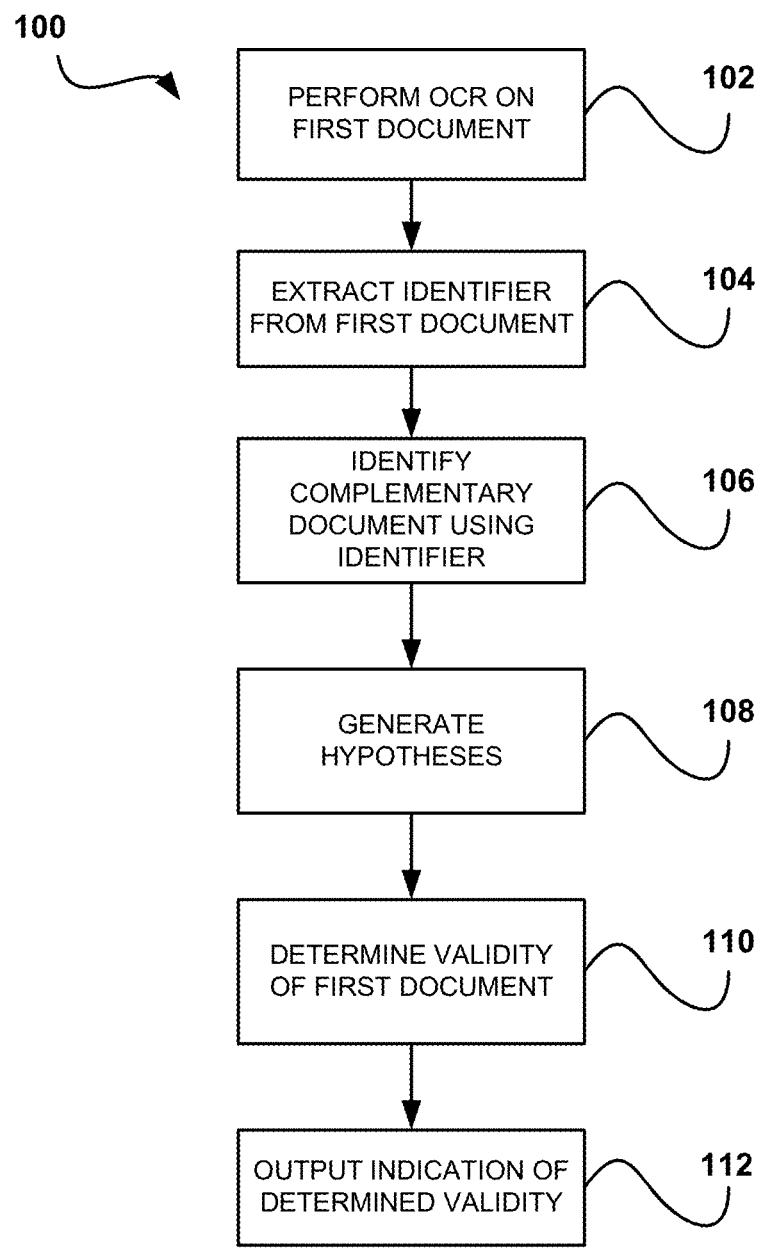
FIG. 1 is a method for determining document validity in accordance with one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

It must also be noted that, as used in the specification and the appended claims, the singular forms "a," "an" and "the" include plural referents unless otherwise specified.

In one general embodiment, a computer-implemented method includes: capturing an image of a document using a camera of a mobile device; performing optical character recognition (OCR) on the image of the document; extracting an identifier of the document from the image based at least in part on the OCR; comparing the identifier with content from one or more reference data sources, wherein the content from the one or more reference data sources comprises global address information; and determining whether the identifier is valid based at least in part on the comparison.

In another general embodiment, a computer program product includes a computer readable storage medium having stored/encoded thereon computer readable program instructions. The computer readable program instructions are configured to cause a processor, upon execution thereof, to: receive an image of a document; perform optical character recognition (OCR) on the image of the document; extract an identifier of the document from the image based at least in part on the OCR; compare the identifier with content from one or more reference data sources, wherein the content from the one or more reference data sources comprises global address information; and determine whether the identifier is valid based at least in part on the comparison.

In still another general embodiment, a computer-implemented method includes: capturing an image using a camera of a mobile device; classifying the image as an image of a document, wherein the classifying comprises: generating a first feature vector representative of the document, based on analyzing the image; and comparing the first feature vector to a plurality of reference feature matrices. The method further includes performing optical character recognition (OCR) on the image of the document; extracting an identifier of the document from the image based at least in part on the OCR; associating the image of the document with metadata descriptive of one or more of the document and information relating to the document; and storing the image of the document and the associated metadata to a memory of the mobile device.

The receiving party, in one approach, has to validate the content of the received document by comparing the document's content with its view of the transaction, which in most cases is stored electronically in a database; i.e., the receiver has to retrieve or extract the information from the received document and compare it to the corresponding information stored in its database. This, for example, can be achieved by a human reading the document, encoding its data, and comparing it to the corresponding content of the receiver's database. The extraction of the information can be, at least to some extent, automated by utilizing technologies that automatically extract the relevant information from the document.

Today many documents still are received on paper and are built for human readability. The layout and the forms of the documents differ vastly between senders and are loosely structured, making the automatic extraction and recognition of the relevant information using prior art methods very challenging and inaccurate. This challenge is particularly difficult in the context of business and communications between international parties, where for instance the format and content of corresponding documents (such as mail, identity documents, etc.), as well as information represented therein (such as address information) may differ significantly.

One way of extracting the information from a piece of paper is by the use of a program that first transforms the paper image into text, then navigates through the text and performs the extraction of the needed fields. Many of these programs look for special features of the text or image to locate the relevant information. This requires significant knowledge of the document structure and the document language.

To finalize the validation, the extracted data are passed on to a person or a program that compares the extracted data with the content of the receiver database, corrects the errors, and validates the transaction. In order to achieve an effective automatic comparison of the extracted data to the content of the database, one has to first resolve semantic differences between the sender's and the receiver's language. There often exist many subtle differences in language, making direct and hence automatic comparisons ineffective. For example, the sender and the receiver might use different units resulting in different values that cannot be directly compared. Thus, data normalization that translates the sender's language to the receiver's language in his database has to occur prior to the automatic comparison to achieve a satisfactory automation rate.

An alternative process to validate business transactions is to utilize an electronic data interchange (EDI) which allows a direct, i.e. automatic, comparison and, thus, validation, of the transaction as understood by the parties involved without having to extract or to normalize the data. EDI achieves this level of automation by solving up-front the data normalization problem through the use of standardized document forms for the information exchange. The set-up of these forms is time- and cost-intensive, resulting in a process that does not adapt easily to a changing environment.

In one embodiment, an automatic business transaction validation process allows an automatic transaction validation level that comes close to EDI without the need of manually defining standardized document forms. This is achieved by going beyond the sequential process of information extraction, followed by data normalization and then comparison to the receiver's database as described above. The new process utilizes all information available simultaneously to validate the transaction. The different sources of information are the received document, the receiver's expectation of the transaction as stored in his database, and business rules pertaining to the specific transaction. The new process simultaneously analyzes the information from these sources and uses the complementary information to validate the interaction.

Several exemplary embodiments and descriptions thereof are provided below in the context of a business transaction involving a document such as an invoice or other financial document. Those having ordinary skill in the art will appreciate that the inventive concepts presented herein are equally applicable to retrieval, validation, and/or normalization of geographic information such as partial or complete addresses, which may be obtained from any suitable source such as an ID, a letter, a form, a check, a sign, images thereof, etc. as would be understood by a person having ordinary skill in the art upon reading the present disclosures.

Specifically, the process allows to automatically correct extraction and OCR errors as well as to automatically normalize the data yielding a highly efficient comparison of the received document to the receiver's database and, thus, results in an efficient automatic validation of the transaction. In addition, over time the process is able to learn data formatting specific to a sender, which in turn improves the level of automatic transaction validation for this specific sender. In summary, the new process allows out of the box automatic transaction validation independent of the source of the received documents (paper or electronic). Over time the process allows to automatically build highly specific data normalization for each receiver. In essence the new process generates automatically the standardized document form used by EDI on the receiver side.

In one embodiment, an address and/or paper invoice validation process includes the following steps. First, a document such as an identity document or a paper invoice is scanned or imaged, e.g. using a camera of a mobile device. Next, Optical Character Recognition (OCR) is applied to the scanned or imaged document. Additionally, information is extracted from the document. Examples of extracted document-header information are document-number, total amount charged, name and address of sender. Extracted information may also include an address which may not necessarily be a sender's address, but instead an address relating to a sender, for example an address of a sender's agent responsible for dispatching documents, an address of an intermediate recipient of the document (e.g. a courier or other mail handling facility, professional, or service, etc.), or any address that may be associated with a sender's address, for example an address associated with a sender's address in a relational database, in various approaches. The extraction of line item information like quantity, description, unit price, and total charge of line item is difficult to perform effectively and reliably. Accordingly, line item extraction may often be skipped.

Further, the extracted information is validated manually. If necessary, OCR errors and the labels assigned by the extractor to specific fields are corrected. For example, it is determined whether the number identified by the extractor to be the purchase order number is actually the customer number. Further still, the content of extracted information is validated by matching against the purchase order. For example, the total amount charged as extracted from the invoice may be matched to the total amount ordered in the purchase order. Also, the invoice is validated by checking validated information against invoice validation rules.

However, several challenges arise with this process. First, the set-up of an effective and reliable automatic extraction system is time intensive. Especially, as mentioned above, the extraction of line items is difficult. Automatic systems for line item extraction often rely on template-extraction, with the need of having a custom-built template for every vendor. Yet the information held by the line items is important to validate the invoice. Similarly, information held in an address line may be important to validate the invoice or other types of documents depicting addresses, such as IDs, etc. as set forth herein.

Additionally, for the validation of the invoice, a large portion of the extracted information may be irrelevant. Given the described process, the knowledge of which information is important for invoice validation and which information can be disregarded is not available to the operator responsible for validating the extracted information. As a result, the operator often validates and corrects more information than is actually needed. Further, manual validation of the content is time intensive. Automated validation of the content requires a set-up process in order to handle semantic differences between the invoice and the purchase order information. For example, the units might differ between the invoice and the purchase order.

In short, one may have to normalize the invoice data in order to achieve an effective automated matching. The set-up of the data normalization is time and labor-intensive. For every supplier specific data normalization is required. Similarly, description of the ordered goods can vary substantially between the invoice and the purchase order. For example, a ninety degree connection pipe might be described as an elbow-connection pipe on the invoice and a right angle connection pipe on the purchase order.

The result of these challenges and problems is that automatic invoice validation is often ineffective and only applicable to a small portion of the incoming invoices, especially when also line item information is needed for the invoice validation. One can further improve the process by using electronic invoices, which effectively eliminate the first two challenges described above. For electronic invoices the data normalization step remains for automated content validation.

One disadvantage of the above invoice validation process is its sequential nature that processes one source of information at a time independent from the other sources of available information. For example, given a scanned paper invoice, the OCR step tries to find the most likely character sequence given the input of scanned pixels. The OCR step does not take into account the information from extraction and the information from validating the extracted content by matching to the purchase order. Obviously, this additional information constrains the possible character sequences and can therefore improve the OCR step. Business rules are another source of additional information that can benefit the OCR step, the extraction step, as well as the data normalization step. For invoices, an exemplary business rule is that the total price of a line item should be equal to the quantity delivered of the line item times the unit price. By utilizing this information in the validation through matching steps, one can, for example, disambiguate unit differences between the invoice and the purchase order. These are just a few out of many examples that illustrate the advantage of simultaneously leveraging additional information in the validation process.

In contrast to the aforementioned process, the inventive document validation process detailed below leverages several or all available sources of information simultaneously to determine the document's validity. In general, the sources of available information include: (1) the document itself; (2) corresponding document(s); and (3) business rules.

Corresponding documents, as described herein, should be understood to include physical and/or electronic documents, as well as electronic records (e.g. in a database) memorializing, representing, or including information derived from physical and/or electronic documents, etc. as would be understood by a person having ordinary skill in the art upon reading the present disclosures. For instance, in one approach where the document is an invoice, corresponding documents may include physical and/or electronic records such as a purchase order, delivery notes, etc. as would be understood by a person having ordinary skill in the art upon reading the present descriptions. In other approaches, corresponding documents may include bills, checks, deeds, etc. which may be considered as corresponding to a document depicting an address such as an ID. In various embodiments, corresponding documents may include one or more of an ID (e.g. a government-issued ID, military ID, employer-issued ID, student ID, etc.), a check, a utility bill, a lease agreement, a bank statement, a pay stub, an insurance card or cards, a tax form, a social security card, a voter registration card, a birth certificate, a green card, a visa, a DHS Form I-9, an IRS W-4, part of a web page, etc. as would be understood by a person having ordinary skill in the art upon reading the present disclosures. Corresponding documents may also include records of any database or electronic repository in which information depicted on or associated with the above exemplary documents may be found. In still more embodiments, complementary documents may include location information, or be associated with location information, as described in further detail below.

The document validation process takes the information from OCR, extraction, validation of the extracted content by matching to the corresponding content, and/or business rules. It evaluates the hypotheses allowed under the combined constraints of the given information and as a result gives a confidence score that indicates the validity of the document or address. In addition, the process also flags potential problems. For example, lines on a document such as line items on the invoice or portions of an address that do not match to any position in the corresponding document, and so forth.

FIG. 1 shows a method 100 for determining document validity. It should be noted that the method 100 may be carried out in any desired environment and using any suitable input document or image thereof, and may be employed in the context of validating any information represented on the document or image thereof.

As shown in operation 102, optical character recognition (OCR) is performed on a scanned image of a first document, which may be a paper document used as part of an overall transaction and/or an image of a document, in various embodiments. The first document may include any physical representation of handwritten, typewritten or printed text. For example, the first document may include an invoice, a receipt, a bill, a sales order document, an insurance claim document, an ID (e.g. a government-issued ID, military ID, employer-issued ID, student ID, etc.), a check, a utility bill, a lease agreement, a bank statement, a pay stub, an insurance card or cards, a tax form, a social security card, a voter registration card, a birth certificate, a green card, a visa, a DHS Form I-9, an IRS W-4, part of a web page, etc. In another example, the first document may include an explanation of benefits document, a medical insurance document, etc. Accordingly, in preferred embodiments, the presently disclosed inventive concepts may be employed as part of an "on-boarding" process, e.g. to validate, normalize, and/or retrieve geographic information from on-boarding documents such as listed hereinabove, and any equivalent type of on-boarding document that would be appreciated by a skilled artisan upon reading the present descriptions. Similarly, corresponding documents and/or information contained therein may be derived from on-boarding documents, in various approaches.

Additionally, in one embodiment, the scanned image may be generated by scanning or otherwise imaging the first document. For example, the document may be scanned using a personal or commercial hardware scanning device, using scanning software, by capturing image data using a camera, e.g. of a mobile device, etc.

Further, the scanned image may include any image that results from the scanning or imaging of a document. For example, the scanned image may include a JPEG image, a bitmap image, a TIFF image, a RAW image, etc. Of course, however, the scanned image may include any image type. Additionally, in the context of the current embodiment, optical character recognition may include any mechanical or electronic translation of the scanned image into machine-editable text.

It should be noted that the OCR step above may not need to be performed in particular circumstances. For example, in one instance, then first document may include an electronic document.

Additionally, as shown in operation 104, an identifier is extracted from the first document. In the context of the current embodiment, the identifier may include any aspect of the first document that can be used for purposes of identification. For example, the identifier may include a purchase order number, a heading of a document, a title of a document, a file name of an OCRed version of a document, part or all of an address, etc. In one embodiment, the identifier may be extracted from the scanned and OCRed version of the first document.

In another embodiment, the identifier may be extracted from the first document by scanning one or more portions of the first document. In still another embodiment, the identifier may be extracted simultaneously with the OCRing of the document. In yet another embodiment, the identifier may be manually extracted. Of course, however, the identifier may be extracted from the first document in any manner.

Moreover, in an alternate approach, rather than extracting an identifier from the first document, the identifier may be obtained and/or input from some other source, e.g., from a user who inputs the identifier; from scanning a bar code on the first document; from a file name of the electronic image of the first document; etc.

An additional aspect of the presently disclosed inventive concepts may include utilizing data other than those data extracted from the document as the identifier. For example, in one approach the identifier may be the entire image of the document, e.g. raw image data "as-captured" using the capture device, or an entire image having been subjected to an extraneous processing operation, such as cropping to remove background, illumination correction (e.g. gamma balancing or adjustment), color depth reduction or conversion (e.g. converting a color image to grayscale or from one color coding scheme (e.g. RGB) to another (e.g. CMYK), etc. as would be understood by one having ordinary skill in the art upon reading the present descriptions.

A still further additional aspect of the presently disclosed techniques includes utilizing as the identifier an entirety of textual information identified and/or extracted from the document (e.g. via OCR). This exemplary approach may be particularly advantageous in embodiments subsequently employing fuzzy matching to validate a document, as described in further detail below. For example, in one embodiment utilizing an entirety of the textual information identified in the first document may be advantageous because the fuzzy matching process is provided more data from which to characterize and/or validate the document, enabling a more robust analysis of the content (e.g. textual information per se) and/or context of the document (e.g. the intended origin of the document, intended destination of the document, intended purpose of the document, etc. as would be understood by one having ordinary skill in the art upon reading the present descriptions).

Further, as shown in operation 106, a complementary document (or documents) associated with the first document is identified using the identifier. In the context of the current disclosures, the complementary document may include any document that is related in some way to the first document. For example, the complementary document may include at least one of a purchase order, a memorandum, a delivery note, etc. In another embodiment, the complementary document may have a relationship with the first document. For example, the complementary document may include a purchase order related to the first document, where the first document is an invoice.

In another embodiment, the complementary document may be identified by comparing the identifier against a database, repository, etc. For example, a purchase order may be identified by comparing a purchase order number against a purchase order repository. In yet another embodiment, the complementary document may be retrieved. For example, the complementary document may be retrieved from the database, repository, etc.

Also, as an option, the identifier may be additionally determined using an additional document and/or identifier that links the first document to the complementary document. For example, a vendor identifier may be extracted from an additional document that links a list of open purchase order numbers with identifiers of vendors.

Further still, as shown in operation 108, a list of hypotheses mapping the first document to the complementary document are generated using textual information from the first document, textual information from the complementary document, and predefined business rules. In one embodiment, the textual information from the first document and from the complementary document may include numerical information, text, a symbol, etc. For example, the textual information may include a description of goods, a line item, a header field item, a unit price, a quantity of goods, an extended price, a street name, a street number, a unit number, a block number, a city name or abbreviation, a county name, a municipality name, a state name or abbreviation, a ZIP code, a country name or abbreviation, etc.

In another embodiment, some textual information may be missing from the first document. For example, there may have been an error with OCRing. In response, columns of the first document may be validated in order to fill in any gaps, and operations such as a square balance may be performed in order to obtain correct textual information from the first document.

In yet another embodiment, a term on the first document may be correlated to a different term on the complementary document as referring to a same thing. For example, different entities, such as suppliers, customers, etc., may use a different formatting, description or different language for similar products, units of measure, address abbreviations, address parts, etc. In another embodiment, a closest match may be determined for the term on the first document if no direct correlation can be found. Additionally, the correlation of the terms may be stored in a database. For example, a translation database may be constructed on-the-fly during the generation of the list of hypotheses for later use. For instance, in one approach address validation, retrieval, normalization, etc. may include expanding any identified abbreviations into full wordings, e.g. "St." becomes "Street," "Ave." becomes "Avenue," "Blvd." becomes "Boulevard," etc. as would be understood by a person having ordinary skill in the art upon reading the present disclosures.

In addition, the list of hypotheses may be generated using non-textual information from the first document and the complementary document, such as lines, colors, symbols, holograms, pictures, etc. Further, the list of hypotheses may be generated using location information from the first document and the complementary document. For example, the location information may include a location of textual information within the first document or complementary document. This location information may assist in generating the list of hypotheses. For example, the location of textual information that is known to be correct may be used to determine whether an error exists with other textual information.

In another embodiment, the hypotheses may include any correspondence between one or more items of textual information of the first document and the corresponding document. For example, the hypotheses may include a match between textual information from the first document and textual information from the corresponding document. Further, the predefined business rules may include any predetermined rules relating to a business. In one embodiment, the predefined business rules may relate to the first document or the complementary document. For example, the predefined business rules may include a rule that a total price of a line item is equal to a quantity multiplied by a unit price. In another example, the predefined business rules may include a rule that all line items have to equal a subtotal of the first document. In still more embodiments, predefined business rules may include rules that define the particular format and/or content of various portions of geographic information such as an address. For instance, rules may define the number and/or type of characters acceptable for a particular part of an address, such as a ZIP code, street name and/or number, country, state, city, etc.

In addition, an expectation or other constraints may be used in the generation of the list of hypotheses. For example, an expectation from an ERP system disclosing that a particular amount of a certain product is to be expected may be used.

In one exemplary embodiment, any fields that potentially match between the first document and the complementary document are selected as potential fields for generating hypotheses. Additionally, a single field may have multiple potential corresponding hypotheses. Once all potentially matching fields have been determined, a structure of the first document and/or the complementary document is determined and the fields are grouped into logical order. For example, the fields may be grouped in a "nearest neighbor" manner. In another example, the fields may be grouped as a description, a quality, a price, a total, etc. Further, the predefined business rules are then used to confirm the validity of the fields. For example, a predefined business rule may confirm that an individual amount field multiplied by an individual cost field equals a total cost field. In this way, accurate hypotheses may be generated using little reconstruction or extraction.

In another exemplary embodiment, extraction is run over the OCRed version of the first document in order to provide textual information as well as an initial idea about each field. After an analysis utilizing the extracted textual information, the predefined business rules, and/or the complementary document, the extracted textual information is optionally altered. For example, numbers, letters, and other field items may be altered according to information obtained from the predefined business rules and the complementary document. After the alteration has occurred, an additional analysis is performed utilizing the altered extracted textual information, the predefined business rules, and the complementary document. In this way, the extracted textual information may be fine-tuned to more accurately relate to the complementary document. Similarly, and as described in further detail below, OCR errors, formatting discrepancies, and/or variations in expression (e.g. differing units, stylistic conventions, etc.) may be resolved via such alteration.

In yet another exemplary embodiment, extraction is run over the OCRed version of the first document in order to identify all lines and groups of lines representative of line items. Additionally, a cross-correlation is performed between the complementary document and the extracted textual information from the first document. Further, the first document is reconstructed using the cross-correlation.

Cross-correlation may also be leveraged in the context of validating geographic information, e.g. as a technique by which extraction and/or validation confidence may be evaluated with respect to different parts of an address. As described in further detail below, in various embodiments correcting OCR errors is a useful feature included in the scope of the presently described inventive concepts. OCR error correction, and indeed simple validation, may be improved by evaluating individual portions information extracted from a related feature (e.g. street name, number, unit number, city, state, ZIP code, etc. may all be considered portions of a related address).

In various embodiments, cross-correlation may also leverage location information. For instance, and in the context of address validation, location information received by a mobile device (e.g. GPS coordinates, location information derived from Wi-Fi network connectivity, location information derived from social media, etc.) may be leveraged for cross-correlation purposes. In one exemplary approach, a document may be imaged using a mobile device, and the location where the image is captured may have associated therewith location information (e.g. GPS coordinates in the form of metadata associated with the image).

The location information stored in association with the image may be used to validate geographic information corresponding to the document, e.g. an address printed on the document. For example, the geographic information may be extracted from the image, and validated against complementary geographic information included in a complementary document (e.g. database record). In response to determining a mismatch between the extracted geographic information and the complementary geographic information, the location information stored in association with the image from which the geographic information was extracted may be compared against complementary location information (which may be included in or associated with the complementary document). If the location information stored in association with the image from which the geographic information was extracted matches the complementary location information, then the geographic information may be validated.

Optionally, an OCR error may be flagged in response to determining the location information stored in association with the image from which the geographic information was extracted matches the complementary location information. In such embodiments, and based on an assumption that the image of the document was captured at or in proximity to the physical location corresponding to the geographic information represented on the document, the extracted geographic information may be replaced with complementary geographic information in a complementary document for which the complementary location information matched the location information stored in association with the image. Alternatively, an OCR correction may be suggested based on the complementary geographic information.

As will be appreciated by a person having ordinary skill in the art upon reading the present disclosures, the foregoing location information-based validation can be done on multiple levels, from the street number, unit number, block number, etc. to larger entities—e.g. streets, cities, etc. For instance, street number, unit number, etc. may be determined with very high accuracy based on leveraging location information associated with images captured while the user is at home, work, or some other predetermined location where documents are received and such documents designate geographic information corresponding to the predetermined location. Similarly, if the extraction result indicates "Newark", but the location information corresponds to a physical location in "New York", then an OCR correction may be suggested or implemented.

In the foregoing manner, location information may also be considered as a suitable type of information included in complementary documents (e.g. records of a database correlating GPS coordinates with address data) and used for purposes of validating geographic information and/or correcting OCR errors, in various embodiments of the presently disclosed inventive concepts.

Moreover, validation and OCR correction may be performed in a hierarchical manner using the various individual portions, and upon determining one portion is valid (e.g. based on a match to corresponding information in the corresponding document) the process may gain confidence in validating other portions (e.g. by matching to other corresponding information in the same corresponding document, preferably an electronic record). In practice, this may be implemented by tolerating mismatches in subsequently evaluated portions when previously evaluated portions indicated a match to the corresponding document. Other implementations may include assigning or incrementing a confidence value reflecting an overall match hypothesis based on each individual matching portion of the extracted information.

In another embodiment, OCR errors in the first document may be corrected using at least one of the textual information from the complementary document and the predefined business rules. Additionally, in another embodiment, data from the first document may be normalized using at least one of the textual information from the complementary document and the predefined business rules. Further, in yet another embodiment, data from the complementary document may be normalized using at least one of the textual information from the first document and the predefined business rules. For example, normalization may include converting grams to kilograms, ounces to grams, dollars to euro, address abbreviations to full words, etc.

In addition, as shown in operation 110, a validity of the first document is determined based on the hypotheses. In the context of the current embodiment, the validity may include an indication of whether the first document is sufficiently related to the complementary document. For example, the validity may include an indication that the first document matches the complementary document. Additionally, the validity may be determined by analyzing the hypotheses. In another embodiment, the determination may be additionally based on a confidence level of the hypotheses.

Further, in one embodiment, an alert may be generated upon encountering a potential problem when determining the validity of the first document. For example, the alert may include an identification of a mismatch in expected similar or identical values in the first and complementary documents. Additionally, in another embodiment, user input may be received indicating at least one of a correction and a validation of items such as a line item, header field item, partial or complete address, etc. of the first document.

Further still, in another embodiment, determining the validity of the first document may include automatically estimating values for expected or actual line items, header field items, address field items, etc. in the first document. Also, determining the validity of the first document may include automatically correcting values for expected or actual line items, header field items, etc. in the first document based on at least one of the textual information from the complementary document and the business rules. In yet another embodiment, the first document may be reconstructed using the hypotheses and business rules, wherein the determining the validity step analyzes the reconstructed first document. As an option, determining the validity of the first document may include globally validating the textual information from the first document. For example, each line item of an invoice may be globally validated, each portion of an address may be validated, etc.

In still another embodiment, upon determining that the first document is valid, knowledge may be generated based on the hypotheses generated. For example, the generating the knowledge may include using transduction. Any transductive method known in the art can be used. Several transductive methods which may be used in various embodiments are set forth in U.S. Patent Application Pub. No. US 2008-0097936 A1 to Schmidtler et al., filed May 23, 2007, and which is herein incorporated by reference.

In one exemplary embodiment, once extracted textual information from the first document has been later verified by an individual, or the extracted textual information has been verified by the determination of a perfect match, the verification is sent to the extractor. In this way, the extractor "learns" from the verified information and can apply the verified information to future extraction and analysis.

Furthermore, as shown in operation 112, an indication of the determined validity is optionally output. The output indication may include text, an image, a sound, or any other indication representative of the determined validity. For example, the indication may be output to a graphical display device, etc. Moreover, the indication may be output to, and stored on, a storage medium, e.g., of a type known in the art, such as RAM, ROM, hard drive, etc. In this way, the first document may be validated straight through, in most instances without human intervention, and with accurate knowledge of what is not valid in the first document. Additionally, in one embodiment, the determined validity may be used to validate a business transaction.

Additionally, a reconciliation screen may be output to a user upon failing to determine that the first document is valid or determining that the first document is invalid. For example, if one or more errors in the first document result in an unresolvable match with the complementary document, the errors are represented in the reconciliation screen, where a human operator (for example, an employee of the customer or the supplier) may view the errors and correct the first document in order to assist in the determination of the validity of the first document. The human operation may be notified via a message, e.g. an electronic mail message, indicating that unresolvable errors exist with the first document. After human correction has been performed, the method may then be repeated on the corrected first document.

In another embodiment, a notification to access the reconciliation screen may be sent to a sender of the first document. Further, a modification to the first document may be received by a user viewing the reconciliation screen. Further still, re-validation of the modified first document may be attempted.

The methodology presented herein may be repeated for sequential documents, which may or may not relate to the same transaction. For example, assume that a second document is part of the same transaction as a first document. After determining the validity of the first document, the validity of a second document may be determined using the original complementary document again, and/or using the first document as the complementary document. Thus, an illustrative sequence may be to run the method of FIG. 1 to validate the first document, then perform OCR on a scanned image of a second document, and extract an identifier from the second document. A second complementary document associated with the second document is identified. As noted above, the second complementary document may be the same as that used to validate the first document, and/or the validated first document may be used as the second complementary document. In another approach, the second complementary document is some other document altogether. A list of hypotheses mapping the second document to the second complementary document is generated using: textual information from the second document, textual information from the second complementary document, and predefined business rules. A validity of the second document is determined based on the hypotheses, and an indication of the determined validity of the second document is output.

In one example, the first document may be an invoice, the validity of which is determined using an associated purchase order as the complementary document. The associated proof of delivery is also to be validated. However, assume it is difficult to validate the proof of delivery against the purchase order due to variations in the way quantities, costs, etc. are shown on the two documents. Once the invoice has been validated, it may be used as the complementary document to validate the proof of delivery.

In another example, the first document may be an ID, the validity of which is determined using an associated address record as the complementary document. An associated application (e.g. for entitlements, services, etc.) in which the address is depicted is also to be validated. However, assume that validating the application against the ID is difficult due to variations in the way the address is represented, abbreviations appearing on the ID or application, missing information on the ID or application, etc. Once the ID has been validated, the ID may be used as a complementary document to validate the application.

Along a similar line, the general method may be performed to again attempt to determine the validity the first document, except this time a different complementary document is used. This approach may be useful for providing a higher confidence of the validity of the first document by providing two or more determinations of validity. This approach may also be used when a first attempt at validating the document fails.

Figure 2:
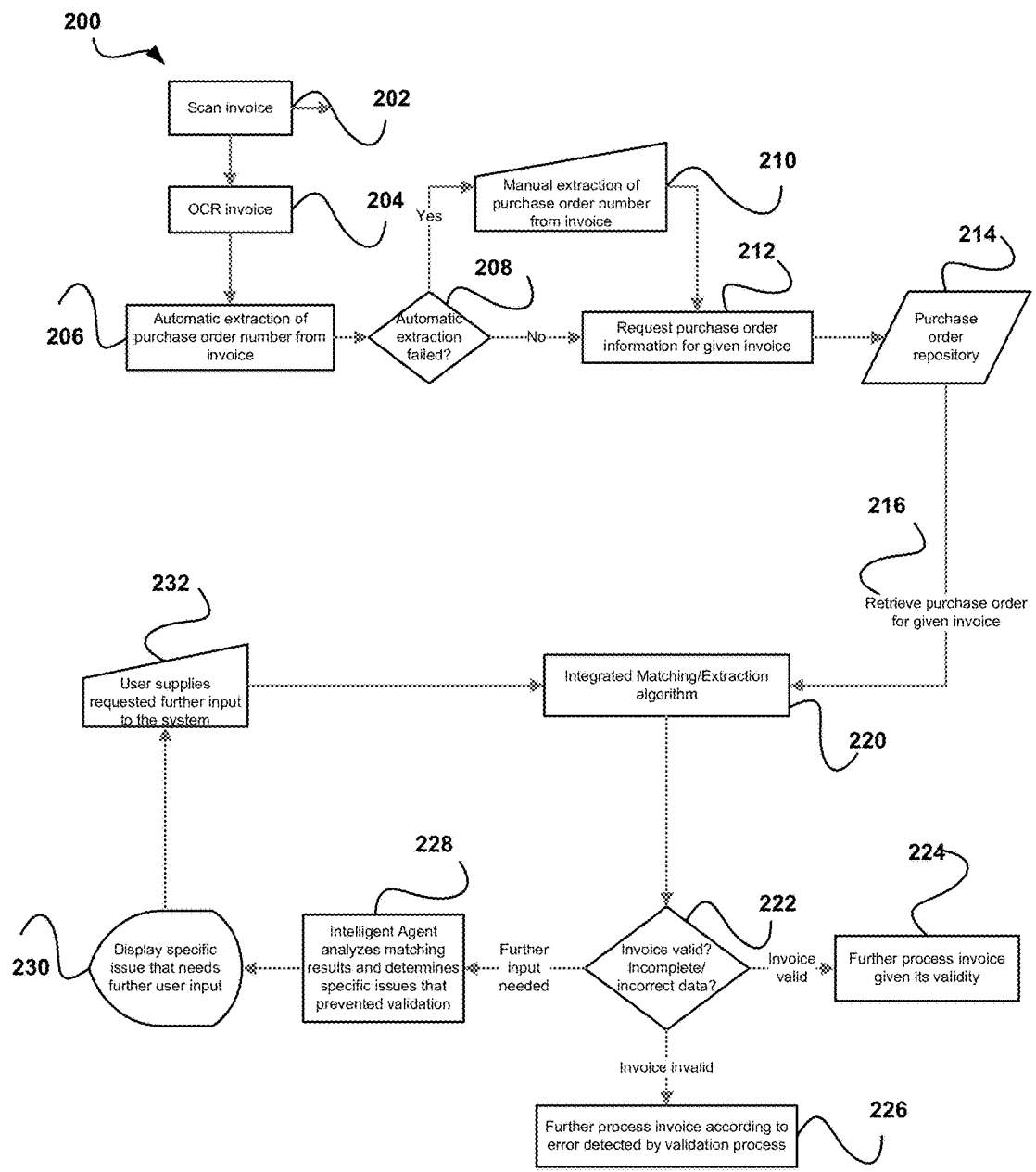
FIG. 2 is a method for determining a validity of an invoice in accordance with one embodiment of the present invention.

FIG. 2 shows a method 200 for determining a validity of an invoice, in accordance with another embodiment. As an option, the method 200 may be carried out in the context of the architecture and environment of FIG. 1. Of course, however, the method 200 may be carried out in any desired environment. As will be appreciated by skilled artisans upon reading the instant descriptions, while methods 200 and 300 are described in the context of determining validity of an invoice, the principles set forth are equally applicable to determining validity of other document types using other information commonly included in the respective document type. Such information may include the content of the document, which may include text, lines, symbols, pictures, holograms, logos, etc. Such information may also preferably include location information, especially location information that corresponds to particular content.

Accordingly, the following descriptions' reference to "invoices" and "line items," etc. should be understood as interchangeable with other document types (e.g. IDs, bills, financial documents, etc. as described herein) and "geographic information," respectively. References to particular types of line items described below should be understood as interchangeable with particular types of geographic information as described herein and as would be understood by a person having ordinary skill in the art as being equivalent to particular types of geographic information described herein, upon reading these disclosures. References to purchase orders or other complementary documents should be understood as interchangeable with reference geographic information as described herein, preferably including one or more records of a database or other repository comprising global address data, optionally organized according to locality.

As shown in operation 202, an invoice is scanned. Additionally, in operation 204 the scanned invoice is OCRed. Further, in operation 206 an attempt is made to extract a purchase order number and/or a seller address from the invoice. In one embodiment, the extraction may be for purposes of identifying a purchase order corresponding to the invoice. In another embodiment, the extraction may be performed by a simple extractor.

In operation 208, it is determined whether the automatic extraction has failed. If it has, in operation 210 the purchase order number and/or the seller address are manually extracted from the invoice.

Additionally, if in operation 208 it is determined that the automatic extraction has not failed, in operation 212 purchase order information is requested for the given invoice from a purchase order repository 214. For example, the purchase order information may be requested from an ERP system.

Further, in operation 216 the purchase order for the given invoice is retrieved from the purchase order repository 214. In on embodiment, a set of purchase orders may be retrieved for the given invoice.

Also, the purchase order for the given invoice retrieved in operation 216 as well as the scanned and OCRed invoice are processed utilizing an integrated matching and extraction algorithm 220 which performs integrated iterative invoice validation. In one embodiment, line item information may be automatically identified and validated from the scanned and OCRed invoice by the integrated matching and extraction algorithm 220. For example, unit price, quantity, description of line item, and line item price, in addition to a subtotal charge, a tax charge, a shipping and handling charge, and a total price may be automatically identified and validated from the invoice. In another example, a statistical extractor may be run over the invoice. The statistical extractor may provide information about extracted data such as the unit price, quantity, description, line item price, etc.

In addition, it is determined by the integrated matching and extraction algorithm 220 in operation 222 whether the invoice is valid. For example, it may be determined whether the invoice contains incomplete or incorrect data. If it is determined in operation 222 that the invoice is valid, then in operation 224 the invoice is further processed given its validity. If it is determined in operation 222 that the invoice is invalid, then in operation 226 the invoice is further processed according to one or more errors detected by the validation process.

However, if it is determined in operation 222 that further input is needed, in operation 228, an intelligent agent analyzes any matching results and determines specific issues that prevented validation. Additionally, in operation 230 specific issues resulting from the analysis by the intelligent agent in operation 228 that need further input from a user are displayed. Further, in operation 232 the user supplies any requested further input, and this further input is in turn processed utilizing the integrated matching and extraction algorithm 220 along with the information extracted in operation 220 and the purchase order for the given invoice retrieved in operation 216.

For example, in the event that the invoice cannot be automatically validated, the system may request additional information from the user by prompting the user to correct and validate OCRed data and extraction results for specific fields on the invoice that prevented the automatic validation of the invoice. The corrected and validated information may then be fed back to the integrated matching and extraction algorithm 220 in order to reevaluate the validity of the invoice given the additional information. As an option, this process may be reiterated until the invoice is either validated or a serious problem with the invoice has been identified that makes the invoice invalid.

In another example, the system may automatically identify with high accuracy specific information on the invoice that prevents automatic validation. This may be achieved by the intelligent agent which analyzes matching hypotheses utilizing business rules. The intelligent agent may minimize the necessary input, which may result in highly efficient manual validation and correction.

As a result, the above method 200 offers many advantages when compared to other invoice validation approaches. For example, the above method 200 may provide zero set-up, and may allow for a substantially larger number of invoices that can be processed straight through without any human intervention. Additionally, the above method 200 may provide for accelerated manual validation and correction of OCR and extraction results, as well as an efficient identification of invalid invoices. In this way, it may be determined whether circumstances such as underdelivery, overdelivery, and overpricing are occurring based on one or more invoices without the need for a specialized employee to search or analyze such invoices.

Further, the above method 200 may provide for the simultaneous use of different sources of available information. By utilizing the knowledge from extraction, comparing it to the expectation of the purchase order, and checking against the applicable business rules, the above method 200 may yield improved extraction accuracy. In particular, line item extraction accuracy may be substantially improved. Further still, the above method 200 may provide for automatic OCR error correction as well as automatic data normalization. Also, since the above method 200 is an integrated process, any improvements may feed on each other. For example, improved OCR may result in improved extraction, which in turn may yield better matching, and so forth.

Figure 3:
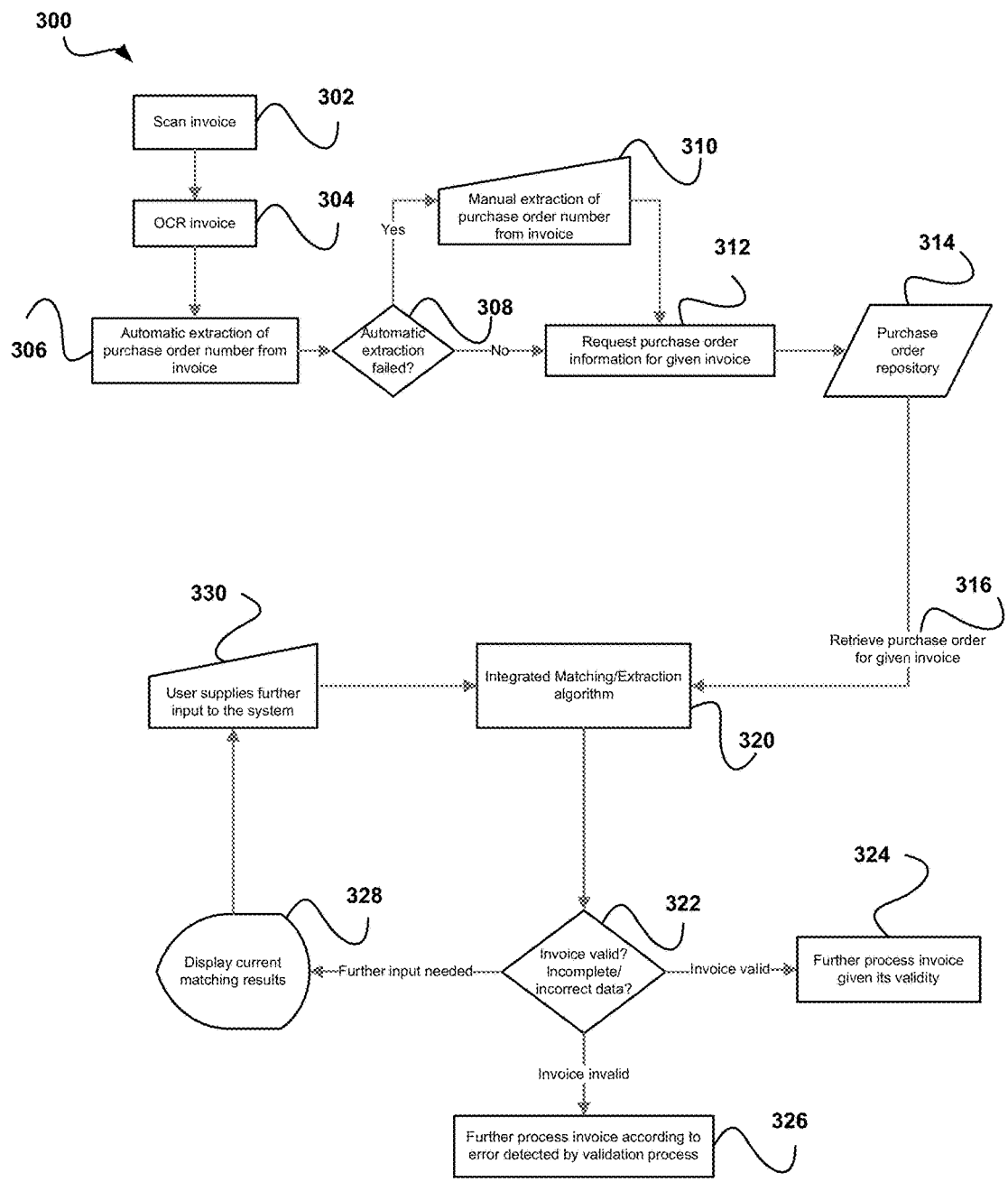
FIG. 3 illustrates a method for determining a validity of an invoice without the use of an intelligent agent in accordance with one embodiment of the present invention.

FIG. 3 shows a method 300 for determining a validity of an invoice without the use of an intelligent agent, in accordance with yet another embodiment. As an option, the method 300 may be carried out in the context of the architecture and environment of FIGS. 1 and/or 2. Of course, however, the method 300 may be carried out in any desired environment.

As shown in operation 302, an invoice is scanned. Additionally, in operation 304 the scanned invoice is OCRed. Further, in operation 306 an attempt is made to extract a purchase order number and/or a seller address from the invoice. In operation 308, it is determined whether the automatic extraction has failed. If it has, in operation 310 the purchase order number and/or the seller address are manually extracted from the invoice.

Additionally, if in operation 308 it is determined that the automatic extraction has not failed, in operation 312 purchase order information is requested for the given invoice from a purchase order repository 314. For example, the purchase order information may be requested from an ERP system.

Further, in operation 316 the purchase order for the given invoice is retrieved from the purchase order repository 314. In on embodiment, a set of purchase orders may be retrieved for the given invoice.

Also, the scanned and OCRed invoice, as well as the purchase order for the given invoice retrieved in operation 316, are processed utilizing an integrated matching and extraction algorithm 320 which performs integrated iterative invoice validation. In addition, it is determined by the integrated matching and extraction algorithm 320 in operation 322 whether the invoice is valid. For example, it may be determined whether the invoice contains incomplete or incorrect data.

If it is determined in operation 322 that the invoice is valid, then in operation 324 the invoice is further processed given its validity. If it is determined in operation 322 that the invoice is invalid, then in operation 326 the invoice is further processed according to one or more errors detected by the validation process.

However, if it is determined in operation 322 that further input is needed, in operation 328, current matching results are displayed. Additionally, in operation 330 a user supplies further input into the system, and this further input is in turn processed utilizing the integrated matching and extraction algorithm 320 along with the information extracted in operation 320 and the purchase order for the given invoice retrieved in operation 316.

In one embodiment, the validity of the invoice may be determined by simultaneously leveraging information from OCR, information from extraction, matching to a purchase order, business rules, and potentially manually validated information. An example of an algorithm used for this integrated matching process is described in the embodiment below.

In the context of the current embodiment, a position includes a purchase order position, an invoice line includes a physical line on an invoice, and a line-item includes a description of a specific good delivered and the corresponding charges. Additionally, a line-item field includes a component of a line-item with a particular meaning, for example, description of the goods delivered, unit price, quantity and/or extended price. Further, the description includes the specific line-item field that describes the goods delivered. Also, a position match candidate (PMC) includes a combination of line-items that is a candidate to match to a purchase order position. In one embodiment, PMCs may map one to one to positions, whereas line-items do not necessarily have a one to one mapping to positions.

The matching and extraction algorithm validates invoices by comparing the information given on an invoice with the corresponding purchase order. To this end the algorithm performs the following tasks. First, the algorithm validates line-items by associating the line-items on a given invoice with the open purchase order positions of this invoice. Additionally, the algorithm validates the invoice by checking the consistency of the invoice given the extracted values for total, subtotal, taxes as well as other additional charges like shipping and handling against the sum of the validated line-items. Further, the algorithm outputs a score that indicates the validity of the invoice as well as the best association as determined by the algorithm of the line-items and their fields to the purchase order positions.

The algorithm generates a list of matching hypotheses. In one example, a matching hypothesis is a possible association of the line-items and their respective fields to the list of open purchase order positions as well as possible values for total, subtotal, tax and other additional charges necessary to validate the invoice. The algorithm determines for each of the generated hypotheses an overall cost of the association and validation. The hypothesis with the lowest cost is elected as the final result.

The cost may be based on different sources of information. For example, the algorithm may utilize OCR results and a confidence of characters. Additionally, the algorithm may utilize extractor results, e.g. a list of possible label assignments and the associated confidences for every token on the invoice. Further, the algorithm may utilize user provided input such as correction of OCR and extraction results, as well as purchase order information and business rules.

Matching hypotheses are generated in a two-step process. The first step forms a set of PMCs from the invoice line-items. However, a complicating factor here is that line-items may not necessarily map one to one to positions. On occasion, several line-items may map to the same position. Additionally, in one embodiment, several positions may map to the same line-item. Accordingly, the algorithm generates PMCs by combining line-items given the extraction and OCR results. Additionally, in yet another embodiment, line item match candidates (LIMCs) may be created from the set of positions in order to handle the case where several positions map to the same line item.

The second step finalizes the creation of the matching hypothesis by electing a specific one to one mapping of the generated PMC set to the positions and the resulting validation. In another approach, a specific one to one mapping of the generated LIMC set to the line items is selected. In yet another approach, a combination of the foregoing may be used.

For simplicity, the following will refer to PMCs, though it is to be understood that similar methodology may be applied to use of LIMCs and/or the combination of PMCs and LIMCs. The overall cost c of the matching hypothesis is the sum of the individual costs of the two steps, as shown in Table 1.

TABLE 1 c = cPMC + cMAP

As shown in Table 1, cPMC indicates the cost of generating a specific set of PMCs and cMAP is the cost associated with a specific one to one mapping of the generated PMC set to positions and the validation of the invoice. The cost cPMC is factored into the following sum, as shown in Table 2.

TABLE 2 cPMC = cprior + cline + cextraction + cOCR + csequence + calignment

The different costs cprior, cextraction, cOCR, csequence, calignment and cline are defined as shown in Table 3.

TABLE 3 cprior: Cost associated with a specific combination of line-items. It is a heuristic cost containing prior knowledge regarding the combination of line-items. For example the combination of line-items that appear in consecutive order on the invoice is preferred over the combination of nonconsecutive line-items.
cline: The logarithmic sum of the probabilities of the line-items used for the current PMC set to be line-items versus generic invoice lines. The probabilities are based on the different format of line-items compared to generic invoice lines.
cextraction: The logarithmic sum of extraction probabilities of the tokens that have been assigned the labels description, quantity, unit price and extended price for the current PMC set.
cOCR: The tokens assigned the labels quantity, unit price and extended price by the current PMC set have to fulfill the constraint that quantity times unit price equals extended price. The cost cOCR is the cost associated with fulfilling this algebraic constraint given the OCR confidences of the different characters in these tokens.
csequence: This cost captures the prior knowledge that some sequences of line-item fields are more likely than others. For example it is unlikely to observe on an invoice that extended price is the first line-item field on a line-item followed by unit price, quantity and finally description, whereas the sequence description, quantity, unit price and extended price is quite common for a line-item.
calignment: Cost that reflects the observation that line-item fields tend to be aligned vertically As will be appreciated by skilled artisans upon reading the present descriptions, while the foregoing definitions in Table 3 are presented from the context of validating invoices based on content commonly included on invoices, similar principles are applicable to validation of geographic information and based on content commonly included in geographic information such as address information, coordinate information (e.g. latitude, longitude, GPS, etc.), etc. Moreover, conventions in the use and presentation of geographic information in various localities may be taken into account in evaluating/determining costs cprior, cextraction, cOCR, csequence, calignment and cline as shown in Table 3 above. For instance, various parts of an address are typically arranged in a predefined order, which may include one or more lines of geographic information that may also be aligned partially or completely in one or more columns.

Accordingly, it should be understood that references to "line-items" and "line-item fields" as presented in Table 3 are equally inclusive of "geographic information items" and "geographic information fields" as described herein. Any type of geographic information that would be appreciated by a skilled artisan upon reading these disclosures may be included and leveraged in determining the costs cprior, cextraction, cOCR, csequence, calignment and cline, and preferably address data is included for this purpose, in various implementations.

The mapping cost cMAP of the second step is shown in Table 4.

TABLE 4 cMAP = cmatch + cvalid

The variable cmatch represents the total cost of the one to one mapping of the current PMC set to the positions. It is the sum over the individual matching costs of matching a single PMC to a position. The single matching costs are derived from the cost of fuzzy matching the individual line-item fields' description, quantity, unit price, and extended price to the corresponding entries in the position. The fuzzy matching takes into account the OCR confidence of the individual characters in the extracted line-item fields.

Similarly, for embodiments in which geographic information is the subject of validation, fuzzy matching may include evaluating the single matching costs for individual components of the geographic information, e.g. individual components of an address such as a street name, street number, city, state, ZIP code, country, etc. as described herein and would be understood by a person having ordinary skill in the art upon reading the instant disclosures.

The variable cvalid represents the cost that determines the validity of the invoice given the elected one to one mapping of the current PMC set to positions and checking this information against additional information extracted from the invoice according to predefined business rules. For example, the default business rule may be that the sum of the extended prices of the current PMC set balances with the extracted values for invoice subtotal, invoice total, tax, and additional extracted charges like shipping and handling. The cost may be based on the extraction probabilities of the extracted values and the associated OCR confidences of the individual characters.

Again, similar principles may be employed in the context of validating geographic information without departing from the scope of the present disclosure. Validity of geographic information may be determined by evaluating mappings of PMC set(s) to positions and checking this information against business rules applicable to geographic information. For instance, default business rules may include the format and content suitable for different types or pieces of geographic information. In various exemplary embodiments, for instance, street names may be limited to alphabetic characters, street numbers and ZIP codes may be limited to numerical characters, state and/or country designations may be limited to capital alphabetic characters, etc. as would be understood by a person having ordinary skill in the art upon reading the instant descriptions.

For instance, in one embodiment a good example of non-US conventions is Singapore, where 80% or more of the population lives in "apartment blocks". Each such block is a large hi-rise community that has its own ZIP code. The format of such addresses is, e.g.

APT BLK 437 WOODLANDS STREET 41 #14-358 SINGAPORE 730437

As will be appreciated by skilled artisans upon reading the present disclosure, the "APT BLK" prefix exhibits regularity and may be leveraged to validate addresses or other geographic information in Singapore. Similarly, the unit number (#14-358) is formatted as floor-unit. The postal code is also correlated to the block number. Specifically, the last 3 digits are the same. Conventions such as these for other international locations may be similarly leveraged without departing from the scope of the present disclosures, in various embodiments. Accordingly, it should be understood by a person having ordinary skill in the art that the presently disclosed inventive embodiments include performing geographic information validation, retrieval, normalization, etc. using any suitable convention for representing such information in various locations around the globe.

In addition, business rules may define or dictate the amount of information (e.g. string length) for various types and/or pieces of geographic information, in more embodiments. For instance, ZIP codes and street numbers may require and/or be limited to a certain number of numerical digits (e.g. 2-5 digits for street numbers, 5-9 digits for ZIP codes); state and/or country abbreviations may require and/or be limited to a certain number of alphabetic characters (e.g. 2 for state abbreviations, 2-3 for country abbreviations).

Further still, business rules may define the expansion of common abbreviations into full words, such as common street name abbreviations "St." "Ave." "Blvd." "Ct." etc. into "street" "avenue" "boulevard" "court" etc. Preferably, business rules relating to expansion of abbreviations are applied prior to performing the fuzzy matching operation, so as to reduce the likelihood of erroneous mismatches (false positives) or missed matches (false negatives) due to discrepancies between the reference geographic information and the extracted identifier. More preferably, the reference geographic information accordingly includes expanded, i.e. unabbreviated, geographic information, and most preferably the reference geographic information consists of expanded geographic information with respect to one or more of street names, city names, state names, and country names.

The number of matching hypotheses grows in a factorial manner depending on the number of line-items as well as positions. Accordingly, an exhaustive search for the best matching hypothesis becomes quickly unpractical for invoices with more than a dozen of line-items and positions when using prior art methods. The developed algorithm approximates the search efficiently and effectively. The elected approach is described in the following paragraphs.

The number of possible PMC sets is factorial in the number of line-items. Similarly, the number of possible one to one mappings to positions given a specific PMC set is factorial in the number of positions and line-items. Accordingly, the number of resulting possible matching hypotheses is a factorial number of PMC sets combined with an factorial number of mappings making, as mentioned above, an exhaustive search of the matching hypothesis space unpractical using prior art methods.

Searching the PMC set space independently from the mapping space would reduce the complexity of the search. However, this approach yields suboptimal associations of line-items to positions. It applies too severe restrictions on the matching hypothesis search space leading to local optima. An illustrative example is an invoice with a rarely observed layout of line-items. In this instance the best guess for extracted line-item fields is likely to be systematically wrong. Still, the additional costs in cPMC do not sufficiently constrain the problem to overcome the wrong extraction results and, thus, ultimately yield a wrong association of line-items to positions. In this case, the simultaneous analysis of the information contained in the mapping cost cMAP is necessary to resolve the problem.

The elected algorithm searches the PMC set space and the mapping space simultaneously. It copes with the combinatorial growth of the search space given the number of line-items and positions by leveraging a priori knowledge of the specific problem. For example, an exhaustive search of all possible mappings given a specific PMC set is unnecessary. At that point the problem is sufficiently constrained and a greedy search for the best mapping is sufficient. On the other hand a greedy search for the best PMC set tends to yield a suboptimal association of line-items to positions. The final strategy adopted for the search is to apply a restricted combinatorial search of the PMC set space and to combine it with a greedy search for the best mapping given a specific PMC set. The algorithm uses stochastic annealing for the restricted combinatorial search of the PMC set space.

TABLE 5

Algorithm 1 Matching algorithm to find the best association of line-items to purchase order positions.

Require: Positions P for given invoice.
Require: Invoice I, I contains the tokens of the invoice together with their (x, y) positions as well as their corresponding OCR and extraction results.
1:   I := updateInvoice(I) {Depending on additional external input update information contained in I. For example user provided validation or correction of line-item fields and OCR results.}
2:   (M, setOfPMCs, $c_{MAP}$, $c_{PMC}$) := initializeMatchingHypothesis(P, I) {The procedure initializeMatchingHypothesis elects an initial set of PMCs setOfPMCs and determines its best mapping M to positions. It returns the initial matching hyposthesis (M, setOfPMCs) and its cost $c_{PMC}$ and $c_{MAP}$.}
3:   bestMatch := (M, setOfPMCs) {Current best association of line-items to positions.}
4:   minCost := $c_{PMC}$ + $c_{MAP}$ {Current best cost associated with bestMatch.}
5:   while minCost improves sufficiently do
6:       ($c_{PMC}$, setOfPMCs) := nextPMC($c_{PMC}$, setOfPMCs, I) {Generate next PMC set and its cost using stochastic annealing.}
7:       ($c_{MAP}$, M) := findMap(setOfPMCs) {Find best mapping M for setOfPMCs and its cost $c_{MAP}$ using greedy search.}
8:       c := $c_{PMC}$ + $c_{MAP}$ {Overall cost c of current matching hypothesis given by setOfPMCs and M.}
9:       if c < minCost then
10:          minCost := c
11:          bestMatch := (M, setOfPMCs)
12:      end if
13:      updateAnnealingSchedule( ) {Procedure the monitors the changes in the individual costs that constitute the cost $c_{PMC}$ and their relation with the overall cost c. It updates the annealing schedules needed in the routine nextPMC accordingly.}
14:   end while Table 5 describes the aforementioned process in more detail. It starts with a matching hypothesis by generating an initial PMC set and associating the individual PMCs greedily to positions. The main loop of the algorithm tries to improve on the initial matching hypothesis by iterating through the matching hypothesis space. Within each iteration of the main loop the algorithm chooses a PMC set using stochastic annealing and determines its best mapping to positions using a greedy search. The algorithm terminates when the improvement of the overall cost c becomes marginal.

TABLE 6

Algorithm 2 Routine nextPMC.

Require: Input PMC set setOfPMCs.
Require: Cost $c_{PMC}$ of setOfPMCs.
Require: Invoice I,
1: (modCombo, cost) := modifiedLineItemCombination(setOfPMCs, I) {Procedure that randomly add/removes line-items and their combination according to the cost $c_{prior}$, $c_{line}$ and the annealing schedule. It returns a modified combination modCombo of line-items and the new cost for $c_{prior}$ and $c_{line}$.}
2: ($c_{PMC}$, setOfPMCs) := modifiedPMCs(setOfPMCs, I) {Procedure that changes randomly labels of some of line-item fields according to the cost $c_{extraction}$, $c_{OCR}$, $c_{sequence}$, $c_{alignment}$ and the annealing schedule. It returns the modified set of PMCs setOfPMCs and its new cost $c_{PMC}$.}

Table 6 illustrates the procedure for iteratively generating the PMC set. A modified PMC set is generated by first making small changes to the current combination of line-items and the considered set of line-item candidates. The changes are sampled according to the costs cprior and cline. Given the current annealing temperature elected changes with a higher cost cprior+cline are sometimes accepted. In a second step the labels of some line-item fields are randomly modified using the costs cextraction, cOCR, csequence, calignment and the current annealing temperature.

While the present invention has been illustrated and described with reference to specific embodiments, further modification and improvements will occur to those skilled in the art. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. For instance, rather than using purchase orders, invoices, line items, purchase order numbers, etc. as described above with reference to FIGS. 2-3 and Tables 1-6, IDs, checks, or any other type of document depicting geographic information such as a street name, number, unit number, city, state, ZIP code, country, etc. may be used as underlying data with which to perform validation, normalization, and correction of extracted information as described herein. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such as facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 4:
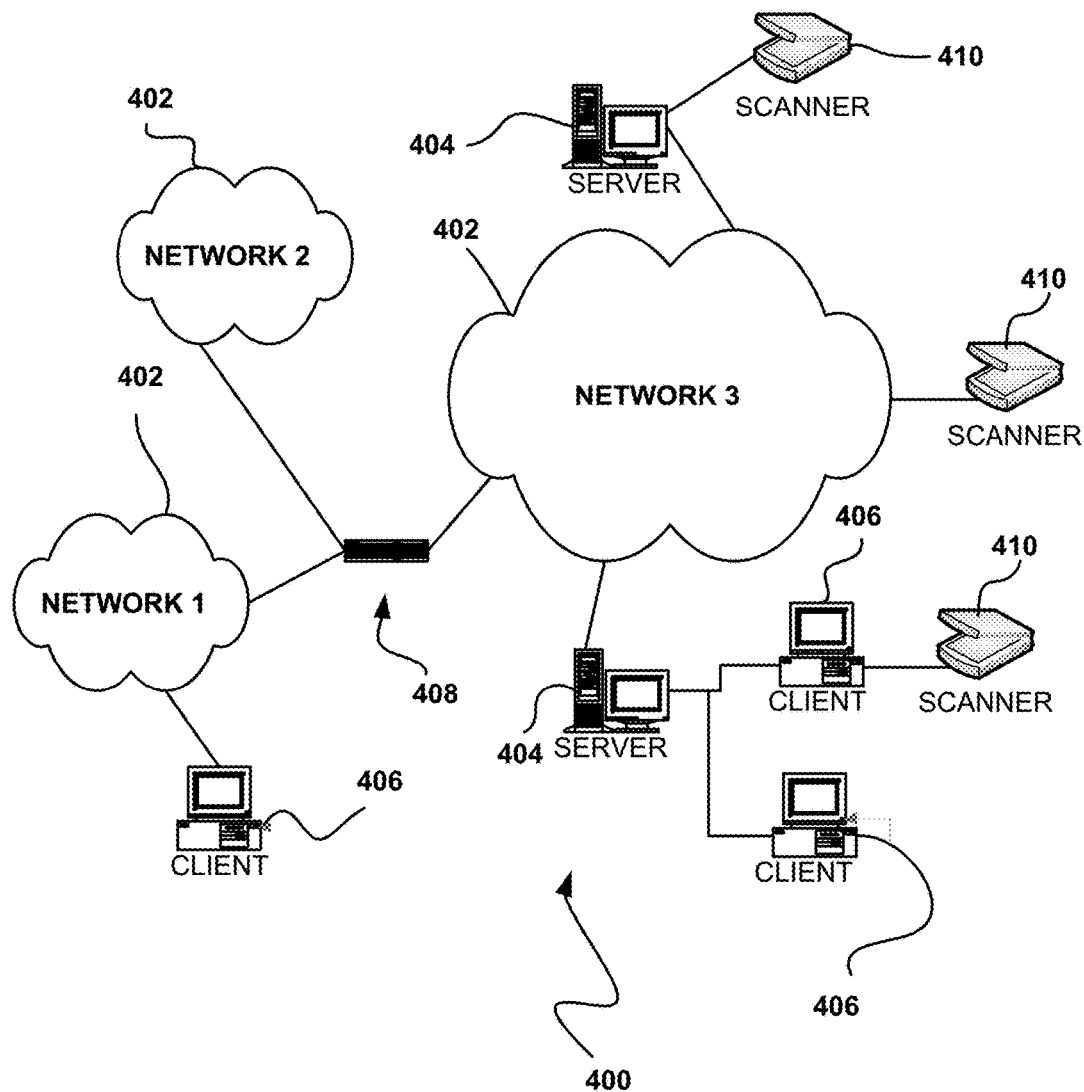
FIG. 4 illustrates a network architecture, in accordance with one embodiment.

FIG. 4 illustrates a network architecture 400, in accordance with one embodiment. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 402, at least one gateway 408 is optionally coupled therebetween.

One or more scanners 410 may be coupled to a network, a server 404 and/or a client 406. The scanner(s) 410 may be accessible by the attached machine and/or remotely by other machines via any interconnection path.

Figure 5:
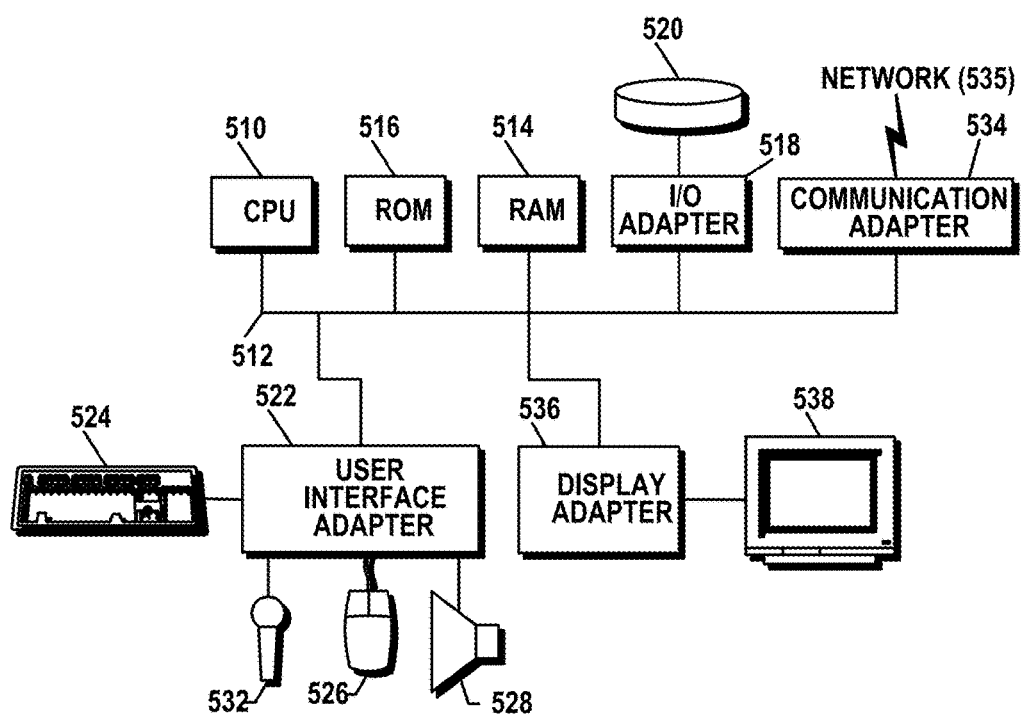
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

In still more approaches, the presently disclosed inventive concepts may be embodied in, practiced using, and/or applied to mobile technology and/or mobile devices. As referred-to herein, a mobile device should be understood to include any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Similarly, while various embodiments have been described herein as employing a scanner, or involving "scanning" a document, image, etc., it should be understood that the concepts are equally applicable to mobile devices, for example any "scanning" operation discussed herein may be applied to a mobile device and/or mobile computing environment, for example by capturing an image using a mobile device camera rather than "scanning" the image or document.

Those having ordinary skill in the art will appreciate that image data generated using a scanner and image data generated using a camera may have unique aspects or characteristics in some approaches. For example, an image captured using a mobile device camera may include artifacts such as skew, perspective distortion (such as apparent warping or curvature in a truly flat or straight surface/edge), illumination, blur, etc. as would be understood by one having ordinary skill in the art upon reading the present descriptions. Nonetheless, the presently described inventive concepts should be understood as being equally applicable to both traditional scanners and associated computing equipment/resources, as well as mobile capture devices and/or processing devices, in illustrative embodiments.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one exemplary approach, an image may be captured by a capture component, such as a camera, of a mobile device. The term "capture component" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

In a particularly preferred approach, the presently disclosed techniques may be leveraged to advantageously facilitate inspection and/or processing of documents depicting geographic information. It should be appreciated that the disclosed techniques and processes may be applicable to any type of documents generally depicting geographic information as described herein, and particularly addresses.

Figure 6:
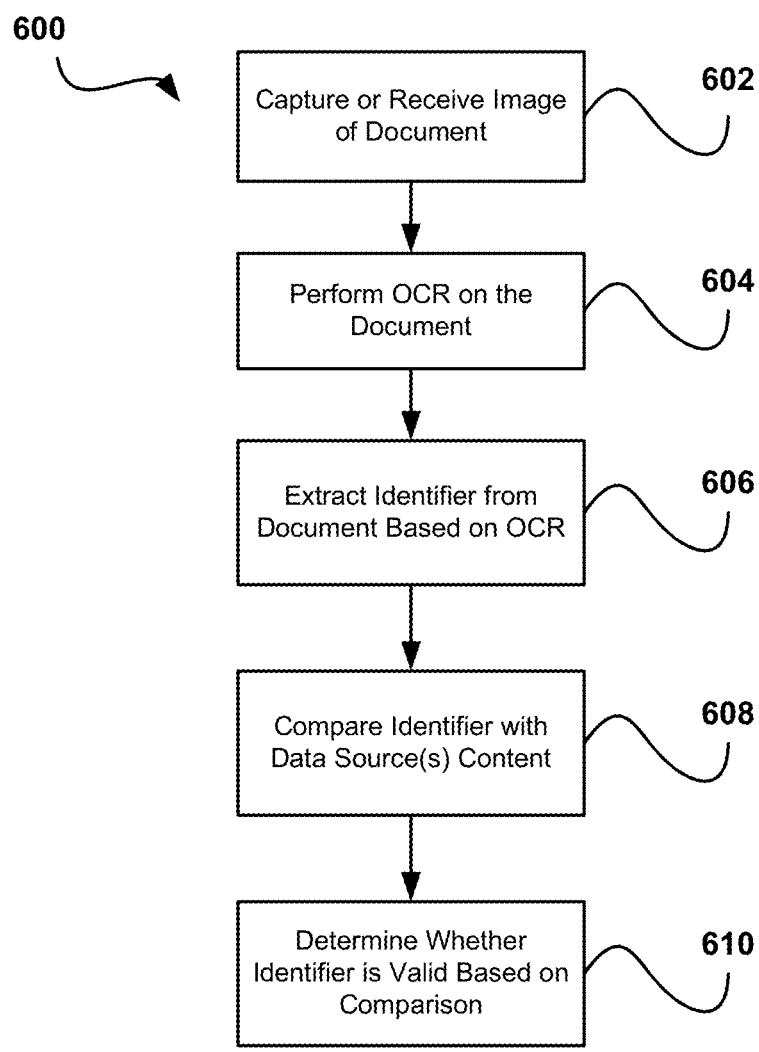
FIG. 6 is a flowchart of a method, according to one embodiment.

One exemplary technique for processing documents including geographic information includes a process substantially as shown according to method 600 depicted in FIG. 6, according to one embodiment. The method 600 may be performed in any environment, including those depicted in FIGS. 1-5, among others, in various approaches. Moreover, in various alternative embodiments the method 600 may include more or fewer operations than those shown in FIG. 6, including any of the various financial document processing operations disclosed herein.

In accordance with the general embodiment depicted in FIG. 6, method 600 includes operation 602, where an image of a document is received, preferably at a mobile device such as a mobile phone. The image may be received according to any suitable technique, in any suitable format, and using any suitable mechanism, convention, or protocol such as would be understood by one having ordinary skill in the art upon reading the present descriptions.

In operation 604, method 600 includes performing OCR on the image. The OCR may be performed in any suitable manner, preferably as described hereinabove.

Method 600 also includes operation 606, where an identifier of the document extracted from the image of the document, optionally based at least in part on the OCR result obtained from performing operation 604.

Method 600 also includes comparing the extracted identifier with content from one or more data sources in operation 608. The data sources preferably comprise one or more relational databases, but may also include other data sources such as nontraditional databases (e.g. fuzzy databases, NoSQL databases, etc.), electronic documents, electronic records, etc. as would be understood by one having ordinary skill in the art upon reading the present descriptions. In particularly preferred approaches, the data sources comprise a database of global address information, which may include or be derived from an existing (e.g. proprietary or open source) source of such address information.

Preferably, the data source(s) include one or more databases, each corresponding to a particular region, country, etc. in which address information is represented or expressed in the same or a substantially similar manner (e.g. same or substantially similar format, content, etc.). More preferably, the address information in the one or more databases is derived from existing source(s) of geographic information such as USPS® address data, OPENSTREETMAP® address data, etc. as would be understood by a person having ordinary skill in the art upon reading the present disclosures. Most preferably, the derived information included in the one or more data sources is characterized by having been normalized, e.g. by expanding all street name, state, country, etc. abbreviations to include the full corresponding unabbreviated information.

Accordingly, in various embodiments techniques as disclosed herein may include obtaining reference data from an existing source of geographic information, and may further include parsing the existing source of geographic information, e.g. using a set of predefined heuristic rules corresponding to a particular locality or localities, to obtain a set of particular geographic information of interest (e.g. a set of reference street names and associated street numbers, city names and associated state names, country names, ZIP codes, etc. in any combination and/or association) for use as reference information in the context of validating geographic information (e.g. identifiers) extracted from images of documents, web pages, etc. as described herein.

An advantage of using predefined heuristic rules as noted above is that the geographic information of interest may be obtained with high confidence based on knowledge regarding the representation or expression of geographic information, particularly address information, according to the particular convention employed within the locality. For instance, and as will be appreciated by skilled artisans upon reading the present disclosure, different regions around the world employ different conventions in representing geographic, and particular address, information. By defining a set of heuristic rules to leverage this convention, e.g. based on predefined business rules as described herein, it is advantageously possible to derive geographic information from a plurality of diverse sources, and compile one or more reference data sources accurately representing the geographic information according to individual localities and/or conventions.

Further still, the geographic information may be normalized as described herein, e.g. based on predefined business rules, to further standardize the representation of geographic information in the reference data sources. As will be understood by persons having ordinary skill in the art upon reviewing these disclosures, such parsing based on heuristic rules and normalization facilitates accurate comparisons of identifiers against the geographic information in the reference data source(s), bolstering the accuracy of the presently described validation processes.

Accordingly, in operation 610, method 600 includes determining whether the extracted identifier is valid based on the comparison performed in operation 608.

In one approach, an image of the document may be received, e.g. at the mobile device, and an image processing operation such as optical character recognition (OCR) may be performed on the image. Based in whole or in part on the OCR results, an identifier, and preferably a unique identifier, may be extracted from the image. The extracted identifier may be compared with reference content in one or more databases, which preferably includes at least one database comprising the identifier(s) and related geographic information, such as a city name, state name, ZIP code, country name, etc. which are associated with a particular street name and/or set of coordinates, where the street name and/or coordinates may comprise the identifier; of course any of the foregoing and equivalents thereof may be used as the identifier or related geographic information, in various embodiments. Preferably the data are organized in a key-⇒value type of relational database.

Based on the comparison and/or the extracted identifier, complementary information is requested from at least one of the databases. The requested complementary information is received, and at least some of the complementary information is optionally output, e.g. for display. In this manner, not only may geographic information be validated, e.g. according to a technique as described above and shown in FIG. 6, but further geographic information may be retrieved based on determining the extracted geographic information is valid, in some approaches.

Preferably, the complementary information that is output is configured and/or formatted for display on a device to which the database(s) are either locally or remotely located. Exemplary devices include a desktop or laptop computer, mobile device such as mobile phone, personal digital assistant, tablet, etc. a data processing and/or storage facility, one or more servers, hosts, clients, etc. as would be understood by one having ordinary skill in the art upon reading the present descriptions.

For example, in one illustrative approach, based in whole or in part on the comparison indicating a match between the extracted identifier and a corresponding "key" identifier in the database(s) to which the related information is an associated value, the extracted identifier and/or related information may be used as a query to retrieve and/or locate the additional information in either the same or another database.

As understood herein, "identifiers" may include but are not limited to geographic information such as latitude and/or longitude coordinates, a street name, a street number, a city name, a state name or abbreviation, a ZIP code, a country name or abbreviation, etc. as would be understood by a person having ordinary skill in the art upon reading the present disclosures. Similar information may be included in the reference data sources, in preferred approaches. Preferably, the identifier is and/or encodes/represents a unique string of alphanumeric characters corresponding to the account in which funds for the tender document are allocated/stored.

The identifier may additionally and/or alternatively be encoded on the document, for example, in a hologram or barcode (including one-, two- and/or three-dimensional holograms/barcodes), in some approaches. In more complex examples, the identifier may include personal identification information such as a name, social security number (SSN), tax ID number, date of birth (DOB), place of residence, a logo, a unique image or photograph (e.g. a photograph of the resident or owner's face), etc. as would be understood by one having ordinary skill in the art upon reading the present descriptions.

Even more preferably, the information and the additional information are included in one or more databases. The database(s) may be used singly or in combination to efficiently and easily retrieve such information for review and/or facilitate the corresponding transactions.

At least some of the databases are preferably stored in a memory of the mobile device. For example, with respect to geographic information in particular, locally storing the database with the identifiers and account-identifying information would enable quick access to such information as compared, for example, to a similar operation using a remotely stored database. Even more preferably, data such as identifiers, geographic information, additional information, etc. may be associated with the image and optionally stored, locally or remotely to the user and/or user device. Any of the data may be associated with the image, for example, as metadata for ease of future reference and use.

Moreover, the app preferably stores an image of the document locally in the mobile device memory. Upon being retrieved/received, e.g. via user input and/or using the first and/or second databases such as described above, information pertaining to the document (e.g. document identifier, etc.) is preferably associated with the stored document image. More preferably, the pertinent information is stored as metadata, though any suitable storage paradigm that would be recognized by one having ordinary skill in the art upon reading the present descriptions may be employed without departing from the scope of this disclosure.

By storing pertinent information locally, the app may more efficiently and conveniently retrieve, display and/or update the pertinent information as needed or useful to the user. For example, those having ordinary skill in the art will appreciate the performance advantages of storing pertinent information locally as opposed to in a remote storage resource, such advantages including but not being limited to reduced processing time, particularly for the processes comparing and/or identifying information stored in the remote storage resource.

In a preferred approach, a user may capture an image of one or more documents. The captured image may be optionally stored to a memory, e.g. a memory of the mobile device, for future use and/or re-use as described herein. Notably, other embodiments of the present disclosures also encapsulate scenarios where a document image is not captured, but otherwise received at a device (preferably a device having a processor, such as a mobile device) for subsequent use in determining information associated with the document.

The image of the document is analyzed by performing OCR thereon. The OCR may be utilized substantially as described above to identify and/or extract characters, and particularly text characters, from the image. Even more preferably, the extracted characters include an identifier that uniquely identifies the document. The identifier may take any suitable form known in the art, and in some approaches may be embodied as an alphanumeric string of characters, e.g. a street name and number, a ZIP code, a country name, a state name or abbreviation, etc. as would be understood by one having ordinary skill in the art upon reading the present descriptions.

Upon extracting the document identifier, the presently disclosed techniques may leverage a number of advantageous features to provide a document owner with useful information and/or services regarding the document. For example, in one approach the document identifier comprises one or more of a street name and a ZIP code. A request may be submitted to a remote resource for information corresponding to the document using the identifier as a query. More specifically, in one embodiment the extracted identifier may be compared to textual information from a complementary document.

In particularly advantageous embodiments, the presently disclosed techniques may assist a user by automatically correcting OCR errors and/or normalizing data from the document. For example, a document image is defective in at least one aspect, e.g. the image is blurry or a portion of a document is obscured in a particular image. Moreover, the blurry or obscured portion negatively impacts the identifier extraction process, such that the OCR thereof includes errors. The present techniques may automatically accommodate this type of OCR error by utilizing textual information a complementary document and/or predefined business rules to correct OCR errors and/or normalize data from the document. Several illustrative examples of OCR error correction and data normalization are described below.

In one embodiment, an extracted identifier is compared to textual information from a complementary document. The textual information from the complementary document preferably corresponds to the identifier in the tender document, and may thus be utilized as a comparison point to link a particular tender document to specific geographic information. For example, the complementary document preferably comprises an electronic record in a database or geographic information repository, and the comparison may comprise submitting the extracted identifier as a query to the database which includes the complementary document as a record. Using the extracted identifier as a query, the complementary document (e.g. database record) may be retrieved, e.g. as a value to which the identifier serves as a key in a conventional "key⇒value" relational database structure.

For instance, in a preferred embodiment the complementary document is one record in a database of geographic information, such as geographic information maintained in a repository, which may be subscription-based (such as the UNITED STATES PARCEL SERVICE® address data) or open-source (such as information maintained in OPENSTREETMAP® databases).

In one approach, a match between the identifiers indicates that the document from which the identifier was extracted corresponds to information in and/or relating to the complementary document, and allows facile retrieval of useful additional information contained in the complementary document, such as a street name, city, state, ZIP code, country, etc. as would be understood by one having ordinary skill in the art upon reading the present descriptions).

A mismatch, by contrast, may indicate that the document from which the identifier was extracted does not correspond to the complementary document, and does not enable access to other geographical or other information related thereto.

In preferred embodiments, however, where the mismatch comprises only one or a relatively small number of the identifier characters (up to 25% of the overall characters, at most two characters or less, for example and according to various embodiments), the partial match may be indicative of OCR errors with respect to the extracted identifier, rather than a discrepancy between the "true" identifier and the corresponding identifier information from the complementary document (e.g. the "textual information" in some approaches). Similarly, in embodiments where an identifier or other information is input by a user, a partial match may be indicative of erroneous data input rather than a discrepancy between the "true" identifier and the corresponding identifier information from the complementary document.

To account for, and automatically correct, such OCR and/or data input errors, in some approaches the extracted identifier may be corrected. For instance, preferably the extracted identifier is corrected using the textual information from the complementary document and/or predefined business rules. Predefined business rules, in this context, may preferably include business-oriented or criteria/conditions for processing data, such as setting a threshold for the acceptable amount of mismatch to which correction may be applied (e.g. correction may be applied to mismatches of less than a maximum threshold number of characters, a maximum percentage of characters, etc., corrections may only be applied to mismatches fitting within a predefined set of "acceptable" errors e.g. a number "1" instead of a letter "l" and vise-versa, including dash(es) "—" instead of hyphen(s) "-", etc.) and other similar business-oriented criteria/conditions as would be understood by one having ordinary skill in the art upon reading the present descriptions.

In various embodiments, predefined business rules may also include any type of rule relating to the presentation or expression of geographic information, optionally according to a particular locality, as described hereinabove.

Preferably, the OCR errors may be corrected, for example, by replacing the extracted identifier with the corresponding identifier data from the complementary document textual information. This is a more common and reliable method of correction because it is generally more likely that a reference of information, e.g. a reference database organizing customer account data and subject to data review and/or curation, will contain/report "correct" values for the sought-after data than that an automated or semi-automated image analysis procedure (e.g. OCR) will accurately or "correctly" identify the corresponding values.

Of course, in embodiments where a particular image processing or analysis technique is known to perform particularly well or produce highly accurate results within acceptable confidence intervals, the foregoing assumption may be inverted. In these situations, according to one approach, the extracted identifier may be considered more likely to report the "correct" values for the sought-after data and any mismatches resolved in favor of the extracted identifier values rather than the corresponding values in the reference.

Additionally and/or alternatively, an extracted identifier may be modified, or an identifier may be manually designated by prompting a user to input data. The prompt may be issued, in various approaches, either as a matter of course in the progression through a workflow, and/or in response to determining the existence of a complete or partial mismatch between the identifier (whether extracted, designated, or otherwise obtained/determined) and the corresponding reference information, e.g. textual information from the complementary document.

Detecting the mismatch may, for example, take the form of determining the existence of one or more OCR errors as described above, and prompting the user for input relating to the imaged financial document at least partially in response to determining the existence of the OCR error(s). Most preferably, user input is received via a mobile device, and relates to one or more of OCR errors, the textual information from the imaged financial document and/or the complementary document, and the predefined business rules.

Similarly, other discrepancies not arising from either of OCR errors or data input errors as described above may nonetheless be automatically handled using the present techniques. In one embodiment, according to textual information from a complementary document (e.g. an electronic record in a reference database) an identifier is expected to be in a predetermined format. The extracted identifier may be accurately extracted, but nonetheless be presented in a different format than expected (e.g. the identifier may include or exclude expected symbols or formatting, such as spaces, dashes, or impermissible characters (e.g. a month designation in a date, such as "Jan" or "January" including alphabetic characters where the expected format is strictly numerical, such as "01").

Discrepancies of this nature may be automatically resolved by leveraging data normalization functionalities, and may optionally be based on predefined business rules, as described hereinabove. Additionally and/or alternatively, discrepancies in data formatting may be resolved by leveraging user input to enable normalization. For example, upon determining the existence of a discrepancy, the presently disclosed techniques may seek and/or leverage user input in order to normalize the data. In one illustrative approach, an extracted identifier is recognized as fitting a data format typically associated with a particular type of geographic information (e.g. a street number, name, ZIP code, city name, etc. and preferably including such information as represented or expressed according to a particular locality), but the extracted identifier does not match corresponding textual information from the complementary document due to improper formatting. Rather than attempting to automatically normalize the improperly-formatted identifier, a user may be prompted to designate the appropriate format, either from a list of predetermined formatting options or by defining a format de novo.

Based on the finite set of possible formats for the identifier data, the presently disclosed techniques may be configured to automatically normalize data obtained (e.g. via extraction) from the imaged financial document in a manner that the data obtained from the financial document matches an expected format of corresponding data, e.g. contained/depicted in textual information of the complementary document. For example, upon determining that extracted data such as a date is in a particular format other than the expected format (i.e. the format typically used in the particular locality), it is advantageous to convert the extracted data from the particular format to the expected format, enabling facile and accurate matching between the identifier data derived from the image and the corresponding textual information from the complementary document.

In other instances, it may be advantageous to utilize an iterative approach to achieve data normalization. For example, in one embodiment a first iteration operates substantially as described above—extracting an identifier from an image of a document and comparing the extracted identifier to corresponding data from one or more data sources (e.g. the textual information from the complementary document, database record, the predefined business rules, etc.). However, the first iteration comparison fails to yield any match between the extracted identifier and the corresponding data from the data source(s). In some approaches, the mismatches may be a result of OCR errors rather than true mismatch between the identifier on the imaged document and the corresponding data from the one or more data sources.

OCR errors of this nature may be corrected, in some approaches, by determining one or more characteristics of data corresponding to the identifier. In one embodiment, the first OCR iteration may extract the identifier in an unacceptable format (e.g. the data is not properly normalized) and/or perform the OCR in a manner such that the extracted identifier contains one or more OCR errors. As a result, the extracted identifier fails to match any corresponding data in the one or more data sources, despite the fact that the "true" identifier as depicted on the document actually matches at least some of the corresponding data. False negative results of this variety may be mitigated or avoided by modifying parameters, rules and/or assumptions underlying the OCR operation based on identifier characteristics.

For example, in one embodiment an identifier is extracted, and compared to corresponding data from one or more data sources. The string of characters comprising the extracted identifier does not match any account number in the corresponding data. In response to failing to identify any corresponding data in the data sources, the extracted identifier is further analyzed to determine characteristics thereof.

In one approach, the extracted identifier may be compared to a plurality of predefined identifier types to determine whether the extracted identifier exhibits any characteristic(s) corresponding to one of the predefined identifier types. For example, the extracted identifier and the predefined identifier types may be compared to determine the existence of any similarities with respect to data formatting and/or data values.

Exemplary identifier characteristics suitable for such comparison, in some approaches include string length, string alphabet, (i.e. the set of characters from which the identifier may be formed, such as "alphabetic," "numeral," "alphanumeric," etc.), presence of one or more discernable pattern(s) common to identifiers of a particular type, or any other characteristic that would be recognized by a skilled artisan reading these descriptions. In a preferred approach, identifier characteristics may include any pattern recognizable using known pattern-matching tools, for example regular expressions.

Additionally and/or alternatively, the identifier type may be determined in whole or in part based on one or more identifier and/or document characteristics, such as: a location in the document from which the identifier is extracted; a classification of the document from which the identifier is extracted; a classification of the type of identifier extracted (such as disclosed in related U.S. patent application Ser. No. 13/802,226, filed Mar. 13, 2013, published as U.S. Patent Publication No. 2014/0270349 on Sep. 18, 2014, and herein incorporated by reference); and/or characteristic(s) of data located adjacent, above, below, or otherwise spatially proximate to the identifier on the document, etc. as would be understood by skilled artisans upon reading the instant descriptions.

In some embodiments, location and/or classification of the identifier and/or document type may be based on a connected components analysis, rather than relying on OCR results, and thus the classification may be based on the image features. In this manner, classification may be leveraged as a technique for locating geographic information within an image, and/or regions of an image likely to depict particular geographic information of interest, and subsequently perform OCR on the region to extract the geographic information, and/or perform a second OCR iteration to improve OCR results.

Returning to the notion of identifier characteristics, in a preferred embodiment identifier characteristics may be determined based on a location from which an identifier is extracted being located below data depicting related information, such as an identifier being located below a street address line, which typically corresponds to a city, state, and/or zip code, particularly in documents depicting a mailing address. In another preferred embodiment, identifier characteristic(s) may be determined based on an identifier being extracted from a location horizontally adjacent to related data, for example as is the case for an expiration date or account number, respectively, as depicted on typical credit and debit card documents, or a city name, state name and ZIP code as depicted in US addresses.

In one illustrative approach, the identifier may be determined exhibit characteristics such as consisting of characters expressed only in numerical digits, such a street or room number of an address, a ZIP code, etc. Preferably, identifier characteristics may include characteristics of various types of geographic information, such as the content and format of various types of geographic information as represented and expressed in respective localities around the globe.

Upon determining the identifier characteristics, the extracted identifier may be analyzed to determine whether any convention(s) or rule(s) describing the identifier characteristics are violated, which may be indicative of the extracted identifier including OCR errors, improper data normalization, or both, in various approaches. Accordingly, in preferred approaches, the identifier type may include and/or be associated with a particular locality known to use identifiers of that type in geographic information, and the particular locality may determine how to normalize the identifier, a particular data source to utilize for performing comparisons (e.g. a data source corresponding to the locality or a subset of localities known to use identifiers of the particular type but excluding other localities), etc. as would be understood by a person having ordinary skill in the art upon reading the present descriptions.

Advantageously, associating identifier types with particular localities, and selectively determining a particular data source to utilize for comparisons allows validation of addresses in various global formats without requiring the use of a reference data source including all global address data. As will be appreciated by skilled artisans upon reading the present disclosures, leveraging a plurality of data sources each corresponding to a particular locality, and selectively performing comparisons with only a select subset of data sources, preferably a single data source, reduces computational cost of performing the comparison significantly and improves the likelihood of the comparison appropriately matching the identifier with a corresponding piece of reference geographic information that truly corresponds to the locality. Further still, in embodiments where additional geographic information is retrieved, e.g. from a complementary document or record in the data source, restricting the data source to include only appropriate localities bolsters the accuracy and contextual appropriateness of the additional information that is retrieved.

As an alternative, instead of using plural data sources, a single data source including all global address data may be implemented, and comparisons may be restricted to entries corresponding to a particular locality by limiting a set of records used for the comparison, e.g. by constraining a library of global address data to utilize only a subset of records for comparison. Restrictions of this type may be implemented using any suitable technique that would be understood by a person having ordinary skill in the art upon reading the present descriptions.

In addition, in some approaches geocoding may be utilized to facilitate the retrieval of additional information regarding a particular location of piece of geographic information. For instance, in a scenario where a partial address is depicted and extracted from a document, missing portions of the address may be retrieved based on correlation between various pieces of geographic information represented in the reference data source(s). For instance, assuming the reference data source includes at least the missing portions of the address, the missing portion may be retrieved based on matching one or more portions of the extracted partial address against the complementary record of the reference data source, and supplying other geographic information which may include the missing portion of the address and/or other geographic information. Accordingly, the reference data sources preferably include a complete record of all geographic information associated with locations represented therein (e.g. the address), and such geographic information may include e.g. latitude and longitude coordinates or other information not technically part of the address as well as all parts of the address.

In a particularly preferred embodiment, the aforementioned geocoding approach leverages coordinate information to associate various pieces of geographic information typically included in an address according to the particular locality, and matching the coordinate information to information extracted from the image (or supplied by a user) may facilitate retrieval of any other type of geographic information associated with the matching coordinates.

In another example, and returning to the notion of correcting OCR errors, an extracted identifier fails to match any of the corresponding data in the one or more data sources based on a first comparison therebetween. In response to the matching failure, the extracted identifier is analyzed and determined to be of an identifier type "ZIP code," based at least in part on the extracted string being, e.g. 5-9 characters in length. The extracted identifier is further analyzed and determined to violate a "ZIP code" characteristic. The analysis reveals that while account number strings consist of numeral characters, the extracted identifier includes a non-numeral character, e.g. because one character in the extracted identifier string was improperly determined to be a letter "B" instead of a numeral "8," a letter "1" instead of a numeral "1", a letter "0" instead of a numeral "0," etc. as would be understood by one having ordinary skill in the art upon reading the present descriptions.

The OCR error may be corrected using a second OCR iteration based at least in part upon establishing the identifier characteristic(s). For instance, in a scenario where the extracted identifier erroneously includes an alphabetic character instead of a numeral, the OCR engine may be restricted to an alphabet of candidate characters consisting entirely of numerical digits. The decision to restrict the OCR alphabet, in turn, is based on predefined business rules applying to the expected content and/or format of the identifier. The second iteration, accordingly, properly recognizes the numeral in the identifier, rather than the alphabetic letter erroneously determined from the first iteration.

Preferably, the identifier complies with at least one business rule, such as described above. More preferably, the business rule(s) may be expressed as at least one logical expression (e.g. a rule, formula, a pattern, convention, structure, organization, etc. or any number or combination thereof).

Those having ordinary skill in the art will appreciate that similar business rules may inform an OCR process regarding how to define the extracted identifier string in a variety of situations differing from the numeral/character distinction exemplified above.

For example, in one embodiment a business rule may indicate that a particular alphabet of symbols should be used, e.g. as opposed to a more complete or different alphabet of symbols. The business rule indicates an account number follows a convention including hyphen symbol characters, i.e. "-", but excludes dash symbol characters (i.e. "—"), underscore symbol characters (i.e. "_") and space characters (i.e. " "). Accordingly, if a first iteration does not successfully extract an identifier matching corresponding data, e.g. in the complementary document, a second iteration may be performed using a more restricted alphabet to normalize the extraction results according to the expectations reflected in the business rule(s). Business rules may include any type of definitions, limitations, restrictions, etc. and preferably relate to geographic information as represented in one or more localities, as described above and according to various embodiments.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, comprising a non-transitory computer readable storage medium having stored/encoded thereon computer readable program instructions configured to cause a processor, upon execution thereof, to:
perform optical character recognition (OCR) on an image of a document;
extract an identifier of the document from the image based at least in part on the OCR;
compare at least portions of the identifier with content from one or more reference data sources; and
determine whether the identifier is valid based at least in part on the comparison;
wherein the content from the one or more reference data sources comprises global address information;
wherein the content from the one or more reference data sources is derived from geographic information organized in one or more of a proprietary address database and an open source address database; and
wherein deriving the content from the geographic information comprises:
obtaining the geographic information from one or more of the proprietary address database and an open source address database; and
parsing the geographic information according to a set of predefined heuristic rules, wherein the set of predefined heuristic rules are configured to normalize the global address information obtained from the one or more sources according to a single convention for representing address information.

2. The computer program product as recited in claim 1, wherein the identifier consists of characters selected from a predefined alphabet, wherein the predefined alphabet consists of one or more of numerals, alphabetic characters, and symbols.

3. The computer program product as recited in claim 1, wherein the identifier comprises a partial or complete address.

4. The computer program product as recited in claim 1, wherein the identifier comprises one or more of:
a street name, a street number, a block number, a unit number, a city name, a county name, a municipality name, a state name, a state abbreviation, a country name, a country abbreviation, and a ZIP code.

5. The computer program product as recited in claim 1, wherein comparing at least portions of the identifier with content from one or more reference data sources comprises fuzzy matching the identifier with the content from the one or more data sources.

6. The computer program product as recited in claim 1, wherein the identifier is validated based at least in part on determining a fuzzy match exists between the identifier and at least a portion of the global address information, wherein the fuzzy match is characterized by no more than two character mismatches between the identifier and at least the portion of the global address information.

7. The computer program product as recited in claim 1, comprising locating the identifier within the image based on a connected components analysis.

8. The computer program product as recited in claim 1, wherein the OCR is performed only on a portion of the image determined to depict the identifier.

9. The computer program product as recited in claim 1, comprising determining a locality associated with the identifier; and wherein the set of predefined heuristic rules are selected based on the locality determined to be associated with the extracted identifier.

10. The computer program product as recited in claim 1, wherein deriving the content from the geographic information comprises populating the one or more data sources with the content, wherein the content consists of geographic information parsed using the set of predefined heuristic rules.

11. The computer program product as recited in claim 1, wherein deriving the content from the geographic information comprises normalizing the geographic information to expand one or more abbreviations present in the geographic information; and wherein the content excludes abbreviated geographic information.

12. The computer program product as recited in claim 1, comprising normalizing the extracted identifier prior to comparing the identifier with content from one or more reference data sources, wherein the normalizing is performed according to one or more predefined business rules corresponding to a particular locality.

13. The computer program product as recited in claim 1, comprising determining a locality corresponding to the extracted identifier, and retrieving additional geographic information associated with a location corresponding to the identifier based at least in part on the locality.

14. The computer program product as recited in claim 13, wherein determining the locality is based at least in part on one or more of a content and a format of the identifier.

15. The computer program product as recited in claim 13, wherein retrieving the additional geographic information is based at least in part on latitude and longitude coordinates corresponding to the identifier.

16. The computer program product as recited in claim 1, comprising at least one of:

detecting one or more OCR errors based at least in part on textual information from a complementary document;
detecting one or more OCR errors using one or more predefined business rules;
detecting one or more OCR errors based at least in part on textual information from the complementary document and one or more of the predefined business rules;
correcting at least one detected OCR error using one or more of the predefined business rules;
correcting at least one detected OCR error using textual information from the complementary document;
correcting at least one detected OCR error using textual information from the complementary document and one or more of the predefined business rules;
normalizing data from a complementary document using at least one of the predefined business rules;
normalizing data from the document using at least one of the predefined business rules; and
normalizing data from the document using textual information from the complementary document and at least one of the predefined business rules.

17. The computer program product as recited in claim 1, wherein the identifier comprises non-textual information depicted on the document.

18. The computer program product as recited in claim 1, wherein the identifier is encoded in non-textual information depicted on the document.

19. The computer program product as recited in claim 1, wherein the document is a financial document.

20. A computer program product, comprising a non-transitory computer readable storage medium having stored/encoded thereon computer readable program instructions configured to cause a processor, upon execution thereof, to:

capture an image using a camera of a mobile device;
classify the image as an image of a document, wherein the classifying comprises:
generating a first feature vector representative of the document, based on analyzing the image; and
comparing the first feature vector to a plurality of reference feature matrices;
perform optical character recognition (OCR) on the image of the document;
extract an identifier of the document from the image based at least in part on the OCR;
compare the identifier with content from one or more reference data sources;
determine whether the identifier is valid based at least in part on the comparison; and
in response to determining the identifier is valid:
associating the image of the document with metadata descriptive of one or more of the document and information relating to the document; and
storing the image of the document and the associated metadata to a memory of the mobile device;
wherein the content from the one or more reference data sources comprises global address information;
wherein the content from the one or more reference data sources is derived from geographic information organized in one or more of a proprietary address database and an open source address database; and
wherein deriving the content from the geographic information comprises:
obtaining the geographic information from one or more of the proprietary address database and an open source address database; and
parsing the geographic information according to a set of predefined heuristic rules, wherein the set of predefined heuristic rules are configured to normalize the global address information obtained from the one or more sources according to a single convention for representing address information.

* * * * *

UNITED STATES PATENT AND TRADEMARK OFFICE
CERTIFICATE OF CORRECTION

PATENT NO.         : 9,934,433 B2                                    Page 1 of 1
APPLICATION NO.    : 15/686017
DATED              : April 3, 2018
INVENTOR(S)        : Thompson et al.

It is certified that error appears in the above-identified patent and that said Letters Patent is hereby corrected as shown below:

In the Specification

Column 22, Line 60 please replace "{Procedure the monitors the" with --{Procedure that monitors the--.

Signed and Sealed this
Fourteenth Day of April, 2020

Andrei Iancu
*Director of the United States Patent and Trademark Office*